(12) United States Patent
Maier et al.

(10) Patent No.: US 11,189,999 B2
(45) Date of Patent: Nov. 30, 2021

(54) FEED DEVICE AND POWER SUPPLY SYSTEM

(71) Applicant: Conductix-Wampfler GmbH, Weil am Rhein (DE)

(72) Inventors: Bernd Maier, Schliengen (DE); Frank Kreiter, Malsburg (DE); Martin Nöltner, Lörrach-Haagen (DE); Dietmar Lang, Schliengen (DE)

(73) Assignee: CONDUCTIX-WAMPFLER GMBH, Weil Am Rhein (DE)

( * ) Notice: Subject to any disclaimer, the term of this patent is extended or adjusted under 35 U.S.C. 154(b) by 266 days.

(21) Appl. No.: 16/342,669

(22) PCT Filed: May 3, 2018

(86) PCT No.: PCT/EP2018/061361
§ 371 (c)(1),
(2) Date: Apr. 17, 2019

(87) PCT Pub. No.: WO2018/206395
PCT Pub. Date: Nov. 15, 2018

(65) Prior Publication Data
US 2020/0052476 A1    Feb. 13, 2020

(30) Foreign Application Priority Data

May 9, 2017   (DE) .................. 10 2017 109 989.1

(51) Int. Cl.
*H02G 11/02*        (2006.01)
*H01R 13/453*     (2006.01)
(Continued)

(52) U.S. Cl.
CPC .......... *H02G 11/02* (2013.01); *H01R 13/453* (2013.01); *H01R 43/26* (2013.01); *B66C 13/12* (2013.01); *B66C 19/007* (2013.01)

(58) Field of Classification Search
CPC ....... H01R 13/453; H01R 43/26; H02G 11/02
(Continued)

(56) References Cited

U.S. PATENT DOCUMENTS

| 4,952,165 A | * | 8/1990 | Blaseck | B61G 5/10 |
| | | | | 29/762 |
| 5,306,999 A | * | 4/1994 | Hoffman | B60L 53/31 |
| | | | | 320/109 |

(Continued)

FOREIGN PATENT DOCUMENTS

| CA | 2683194 A1 | 4/2010 |
| CN | 202142764 U | 2/2012 |

(Continued)

OTHER PUBLICATIONS

First Office Action for Chinese Patent Application No. 201880004266., dated Dec. 18, 2019 with partial English translation (12 pages).

(Continued)

*Primary Examiner* — Alexander Gilman
(74) *Attorney, Agent, or Firm* — Paul D. Bianco; Stephen Bongini; Fleit Intellectual Property Law

(57) ABSTRACT

A feed device for supplying electrical power and/or data to an electrical load, which is movable in at least one travel direction relative to the feed device, via cables. An electrical line cable carried along by the electrical load can be connected or is connected to the feed device, and to a power supply system for supplying the movable electrical load. The line cable can be output or retrieved from a reservoir, which is carried along by the load, in accordance with a distance between the reservoir and the feed device. The feed device has at least one connection part, which is rotatable about at least one pivot axis, for the line cable. This feed device, as well as a power supply system having such a feed device, provides protective guidance and storage of the line cable, (Continued)

reducing the risk of kinking or excessive bending of the line cable when moving the electrical load.

26 Claims, 20 Drawing Sheets

(51) Int. Cl.
*H01R 43/26* (2006.01)
*B66C 13/12* (2006.01)
*B66C 19/00* (2006.01)

(58) Field of Classification Search
USPC .......................................................... 439/34
See application file for complete search history.

(56) References Cited

U.S. PATENT DOCUMENTS

| | | | | |
|---|---|---|---|---|
| 8,328,562 | B1* | 12/2012 | Rassoolkhani | H01R 13/2421 |
| | | | | 439/34 |
| 8,993,891 | B2* | 3/2015 | Drane | H05K 5/0239 |
| | | | | 174/152 G |
| 9,620,896 | B1 | 4/2017 | Dubbaka | |
| 10,179,721 | B2* | 1/2019 | Teruzzi | H01H 9/54 |
| 2010/0096157 | A1* | 4/2010 | Diening | H02G 3/185 |
| | | | | 174/53 |
| 2011/0117760 | A1* | 5/2011 | Winstanley | H01R 13/701 |
| | | | | 439/136 |
| 2012/0043291 | A1* | 2/2012 | Ichimura | B66C 13/12 |
| | | | | 212/312 |
| 2013/0076902 | A1* | 3/2013 | Gao | B60L 53/35 |
| | | | | 348/148 |
| 2017/0016572 | A1* | 1/2017 | Notheis | F16M 11/06 |
| 2018/0208443 | A1* | 7/2018 | Hermey | B66C 13/12 |
| 2019/0148926 | A1* | 5/2019 | Travis | H02G 3/185 |
| | | | | 220/3.3 |

FOREIGN PATENT DOCUMENTS

| | | |
|---|---|---|
| CN | 105073623 A | 11/2015 |
| DE | 2116401 A1 | 10/1972 |
| DE | 2144810 A | 3/1973 |
| DE | 8402185 U1 | 4/1984 |
| DE | 3815033 C1 | 7/1989 |
| DE | 20 2006 009750 U1 | 10/2007 |
| DE | 202015004918 U1 | 10/2016 |
| JP | 2011073845 A | 4/2011 |
| WO | 2014/131826 A1 | 9/2014 |
| WO | 2015131882 A2 | 9/2015 |

OTHER PUBLICATIONS

International Preliminary Report on Patentability, dated Nov. 12, 2019, with Written Opinion (English translation) for PCT/EP2018/061361, filed May 3, 2018.
International Search Report dated Jul. 26, 2018 for PCT/EP2018/061361 filed May 5, 2018.
Written Opinion for PCT/EP2018/061361 filed May 5, 2018.
Result of Examination Report for DE 10 2017 109 989.1, filed May 9, 2017.

* cited by examiner

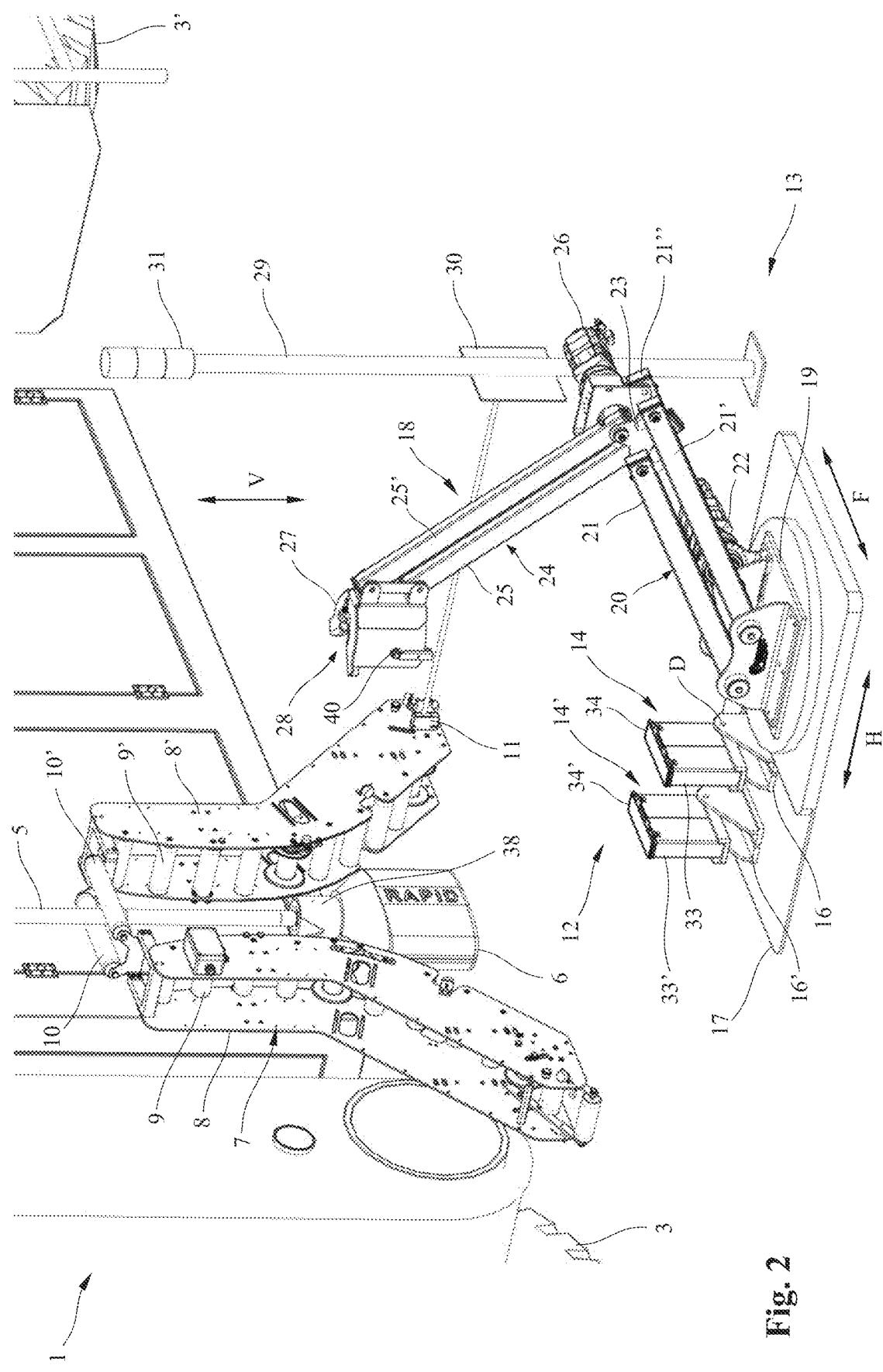

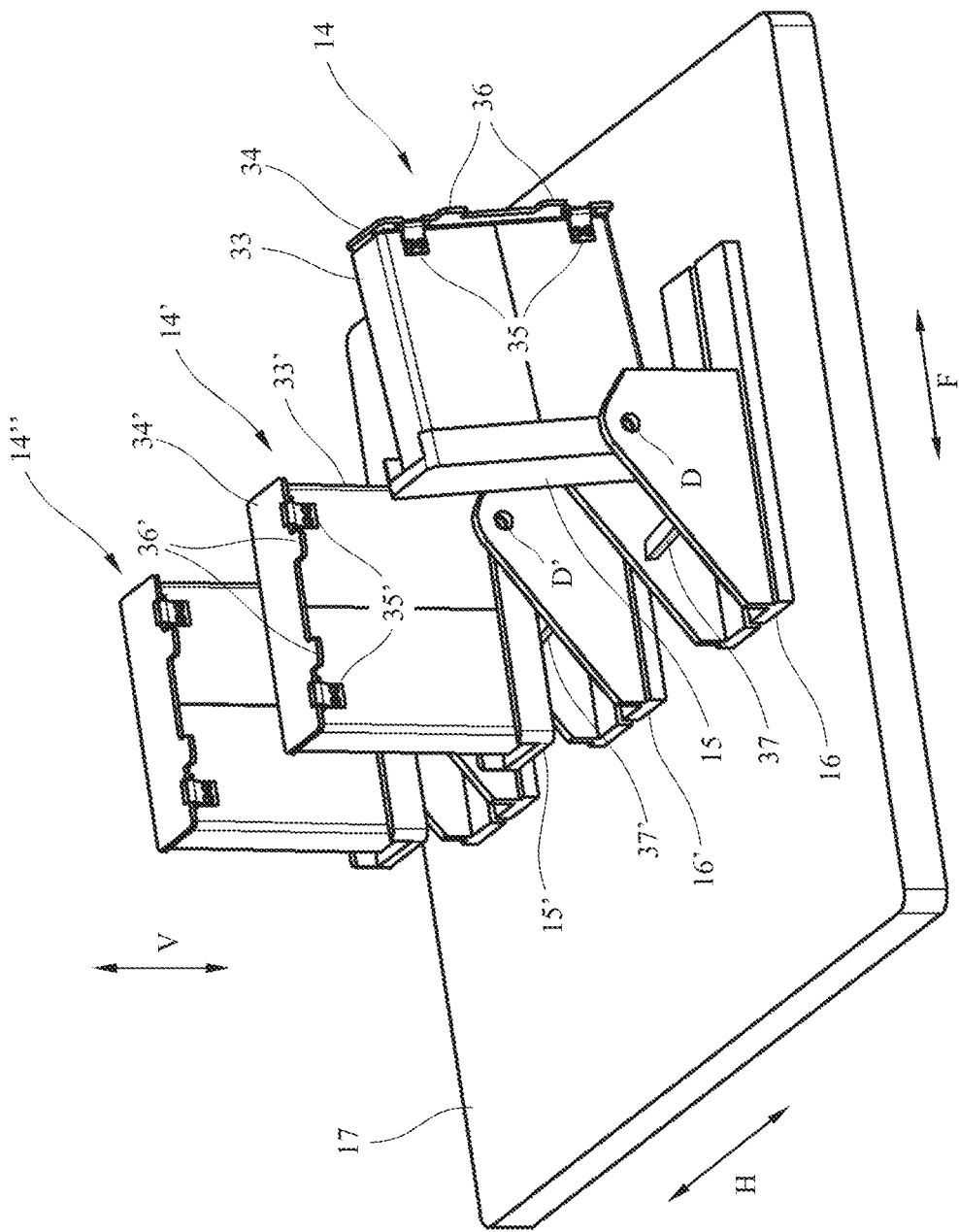

FEED DEVICE AND POWER SUPPLY SYSTEM

FIELD OF THE INVENTION

The invention concerns a feed device.

BACKGROUND

A container-loading crane is known from DE 20 2006 009 750 U1 on which a line cable drum is provided for winding and unwinding of a line cable. The line cable is connected to a fixed feed location, relative to which the loading crane travels in a longitudinal direction. Depending on the travel position the line cable is wound up or unwound by the line cable drum. This has the drawback that the line crane is firmly connected to a travel route along which it moves forward and backward in the longitudinal direction. Cranes have therefore long been mounted on rails and connected to a fixed feed location.

Since cranes are increasingly supposed to travel not only along a single container stacking location but also between different stacking locations offset relative to each other laterally and in the longitudinal direction, they can no longer be connected to a fixed single feed location assigned to the corresponding container stacking location. Instead they must be connectable flexibly to different feed locations.

To make this possible WO 2014/131826 A1 proposes a device for automatic connection of a crane to an electrical power supply, in which case the connection line carried on the crane is provided on the end having a plug that is inserted into a docking station positioned in a hole in the ground. The docking station then has two vertical rods spaced from each other into guide openings of the plug when the plug is introduced to the docking station. Automatic locking in the hole in the ground is also provided there in order to fix the plug on the docking station.

The line cable protrudes vertically upward from the docking station and is then paid out on the ground in the longitudinal direction next to the crane when the crane is moved farther from the docking station. The line cable must then be bent as uniformly as possible and a minimal bending radius of the line cable must be maintained. Tension relief is also provided so as not to damage the electrical wires guided in the line cable when it is pulled out or rolled up. A line cable carrying assembly is therefore additionally included in the known device, around which the line cable coming from the plug in the ground is positioned. The line cable carrying assembly is set down together with the plug on the docking station. This has the shortcoming that either a person must position the line cable around the line cable carrying assembly or the line cable must already be wound onto it beforehand. The line cable assembly is also costly and large and heavy in design so that the device for positioning and accommodating the plug and the line cable carrying assembly must be laid out having sufficient strength and a powerful drive. The entire arrangement to be carried on the crane is also heavy and therefore increases the weight of the crane so that its drive must be designed stronger. This arrangement is also large in design so that it requires considerable space on the crane and increases the width of the crane.

DE 21 44 810 A discloses a tapping point to access power from floors, the tapping point being designed so that it can be countersunk in the floor when not in use. For this purpose, a cover consisting of at least two cover plates is connected to an enclosure made in the floor, the cover plates delimiting an angular space in which the coupling parts for power access are arranged and in which a one- or multipart support element lying on the enclosure carries a cover plate as a function of the position of the cover.

DE 84 02 185 U1 discloses an electrical device, especially an electrical floor vacuum cleaner having a cable winding device accommodated in the device housing for a cable provided with a plug. In order to at least reduce the hazard of defects in the plug area in the automatically winding cable, the cable passes through an inlet shaft arranged in the area of an opening in the housing and/or at least partially forming the opening in the housing, in which case at least its outlet area is smaller than the largest cross section of the plug and the inlet shaft can be elastic and can be widened to a size that is also smaller than the largest plug cross section.

WO 2015/131882 A2 discloses a multifunctional device having a column movable between a horizontal parking position and a nonhorizontal working position, in which an improved spatial range is guaranteed in that the free end of the column having the power supply, media and/or data devices is movable in three dimensions.

JP 2011-73845 A discloses a crane power supply system designed to reduce costs and working time, to improve safety during assembly/disassembly of a connector and to prevent rupture of a cable protruding from the connector. The crane power supply system is then provided to supply a frame, in which case the crane for transfer of a sea transport container contains a feed arranged along a lane on which the container is arranged and a feed cart, in which the feed cart is moved along a slide. The connector has a male and a female part. The male part has an arm connected to a boom gear and extends in a transverse direction of the crane, and a connector that is installed movable along the arm. The female part has a feed connection connected to the connector, a pair of vertical guides to guide the arm to the feed connection and at least one horizontal guide to guide the connector to the feed connection.

DE 21 16 401 A discloses a floor connection device for electrical underground installations with a container introduced into the floor, which is used to accommodate the electrical equipment fastened to a device support and can be closed with a cover, in which case the equipment support is mounted to a pivot on a side wall of the container, preferably on a compensation frame arranged on the container and is held pivoted out in the use position by supports. In order to be able to expose the floor connection device to significant loads in the use position, the equipment support has a mounting site that lies on the container in the use position of the equipment support, preferably on the compensation frame.

SUMMARY OF THE INVENTION

One aspect of the invention relates to addressing the drawbacks just mentioned and permitting gentle guiding and laying of the line cable, especially reducing the hazard of kinking or the unduly strong bending of the line cable during movement of the electrical load. Automatic connection of a line cable to a feed device arranged on the ground is also preferably to be simplified.

Various embodiments of a feed device and a power supply system are disclosed herein. Advantageous modifications in embodiments of the invention are also disclosed.

A connection device mentioned in the introduction is characterized according to the invention in that the feed device has at least one connection part for the line cable rotatable around at least one pivot axis.

The connection part can then be connected to a bearing rotatable around the pivot axis. The pivot axis can advantageously run across the travel direction or a laying direction of the line cable running from the feed device to the movable load, in which the travel direction and the laying direction deviate only slightly from each other, especially no more than 15°.

The pivot axis can also essentially run parallel to a base provided for laying of the line cable, i.e., in the horizontal direction. The connection part can also be pivotable around another pivot axis running essentially perpendicular to a base provided for laying of the line cable. A pivot angle around at least one pivot axis can also advantageously amount to at most 225°, preferably at most 190° and especially at most 160°.

The feed device can preferably have a holding device to hold the connection in a rest position. The line cable can then also advantageously protrude upward in the rest position. With particular advantage the connection can be pivoted out in both directions of rotation of the pivot axis from the rest position so that the load can travel past the feed device. A return device can advantageously be provided in order to move the connection back to the rest position from a position pivoted out from the rest position, in which case a connection lock can be provided to lock the connection in the rest position.

A depression for power and/or data cables arranged in the depression connected movable to the connection point can preferably be provided under the connection part. In particular, the depression can advantageously have a cover with at least one connection opening for the power and/or data cable. The connection part can advantageously have a first protective enclosure movable in relation to the connection part on the side facing the depression. The first protective enclosure can preferably be movable in a second protective enclosure arranged fixed in the depression. The depression can have a cover having a connection opening through which the first protective enclosure is moved.

In an advantageous embodiment the connection part can have a plug connection for a corresponding connection element, especially a connection plug of the line cable, in which the plug connection can be pivoted with the connection part around the pivot axis. A plug lock to lock the connection element on the connection part can also preferably be provided in order to prevent undesired loosening of the connection element during power and/or data transmission. The connection part can also have at least one positioning aid for the connection element of the line cable in order to facilitate connection of the connection element with the connection part, especially the plug connection. The positioning aid can preferably have two centering clamps to accommodate the connection element preferably opposite each other and running laterally next to the plug connection. In an advantageous embodiment the centering clamps can have a vertical guide area essentially adapted to an outside contour of the connection element and/or an insertion area that widens upward.

A power supply system mentioned in the introduction is characterized according to the invention in that an electrical feed device according to the invention described above and subsequently is provided. The line cable can then be advantageously connected firmly to the connection part of the feed device. As an alternative, a connection end of the line cable can advantageously have a connection element and be connectable to the plug connection of the feed device. The reservoir can then preferably be a motor-driven cable drum, in which case the line cable is advantageously wound only cumulatively, but not side by side. A laying direction of the line cable can also advantageously run from the feed device to an outlet of the line cable from a cable guide device arranged on the load.

BRIEF DESCRIPTION OF THE DRAWINGS

The invention is described below by means of detailed practical examples with reference to the accompanying drawings. In these drawings:

FIG. 2 shows a schematic three-dimensional view of a cutout from FIG. 1 with a first connection device according to the invention;

FIG. 7 shows a detailed view of part of the feed device from FIGS. 2 to 6;

DETAILED DESCRIPTION OF THE INVENTION

Figure 1:
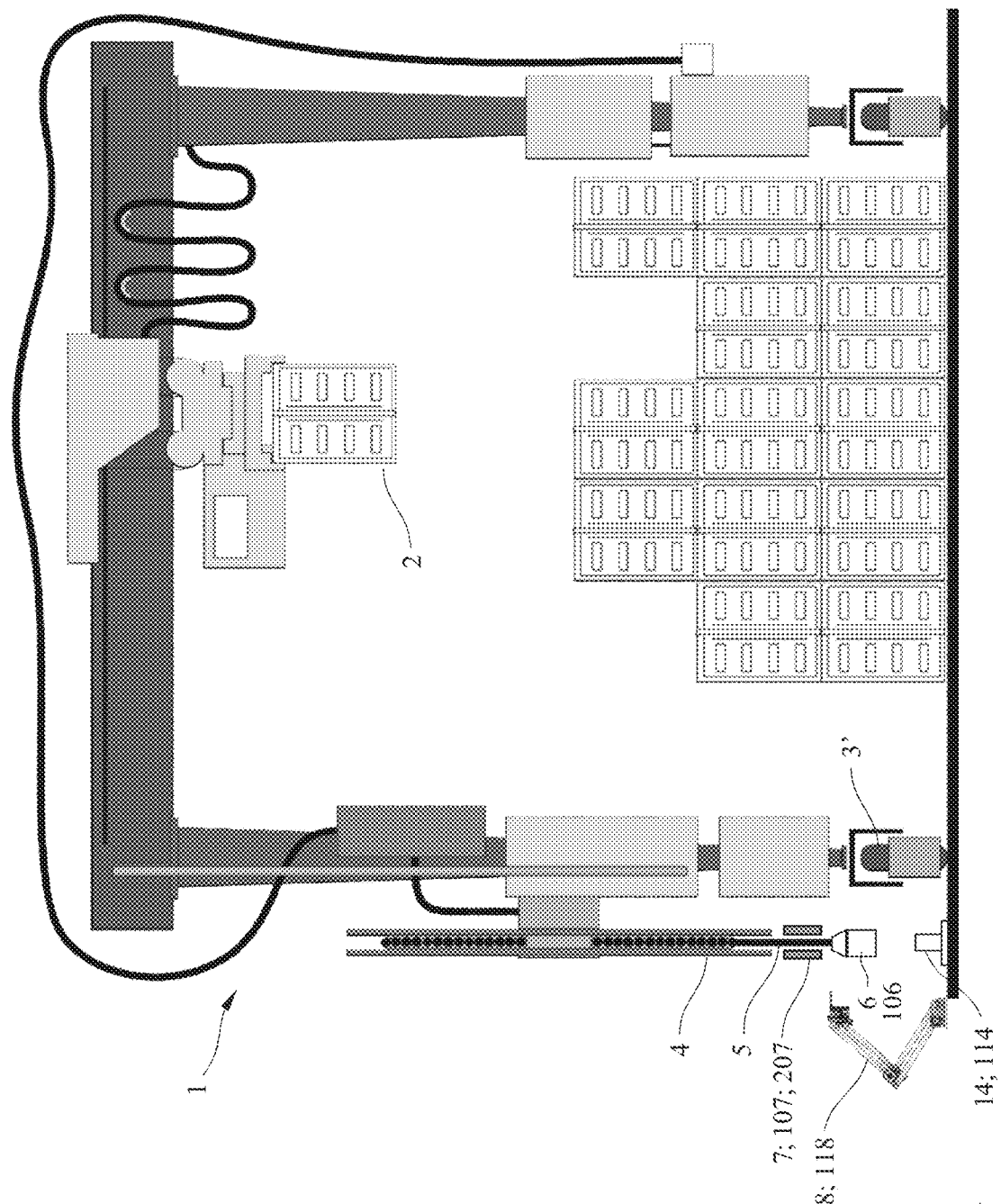
FIG. 1 shows a schematic side view of a power supply system for a container crane.

A known crane 1 for movement of containers 2 located at a container stacking site is shown in FIG. 1, as used at large transshipment facilities, especially in harbors. The crane 1 can travel on wheels 3, 3' in a travel direction F in a driving lane next to the container stacking site, which generally runs parallel to the positioned containers 2. Generally, several such container stacking locations are arranged next to each other and possibly also behind each other at transshipment facilities, in which the crane 1 and other cranes can move between the individual container stacking sites.

In order to supply electrical power to crane 1 and the electrical systems installed on it, for example the motors for lifting and moving container 2 and the electric drives of wheels 3, 3', and/or to transmit data from and to crane 1, a line cable drum 4 is arranged on the outside of crane 1, from which an electrical line cable 5 can be wound up and unwound in a laying direction, corresponding to the travel path of crane 1 in travel direction F. Ordinarily the laying direction and the travel direction F coincide or at most deviate slightly from each other, since the line cable 5 is preferably laid parallel to the travel direction F. Laying of the line cable 5 then occurs according to the movement path of crane 1, which ordinarily also slightly deviates from the ideal line running parallel to containers 2 over the length of the movement path. In this respect "parallel" here and subsequently does not mean exact mathematical parallelism at each point of the movement path, but that the line cable 5 is laid next to the container stacking site in the context of movement and laying inaccuracies. The above is known per se.

On the free downward hanging end the line cable 5 has a connector designed as a connection plug 6 or 106, which can be properly guided as free of stress as possible by means of a cable guide device 7 or 107 arranged on crane 1 for laying on the ground and for retrieval in the cable drum 4.

In the detailed schematic three-dimensional view on a first practical example in FIG. 2 a cutout of crane 1 and wheels 3, 3' is shown obliquely from the side. The cable guide device 7 is also shown there in detail, with which the line cable 5 can be properly laid on the ground using the least possible force and stress input. The cable guide device 7 has two downward widening roller bends 8, 8' opposite each other and offset in the travel direction F of crane 1. A number of freely rotatable longitudinal guide rollers 9, 9' are provided in the roller bends 8, 8', on which the line cable 5 can be guided having the least possible friction. In the lateral direction H across the travel direction F, guiding of the line cable 5 occurs by means of two side guide rollers 10, 10', which are arranged above the roller bends 8, 8' and connect them in the present practical example, which, however, is not necessary. A sensor unit 11 is arranged on the lower end on the right roller bend 8' in FIG. 2, whose function is explained later. However, the sensor 11 could also be arranged on a location of the cable guide device 7 or also on crane 1 and could also be connected in wireless fashion to the control.

For connection of the connection plug 6 an electrical power supply is not shown in detail, a fixed feed device 12 is provided next to the driving lane of the container crane 1 with a connection device 13 arranged there. The feed device 12 in the present case has two connections designed as plug connections 14, 14', which are linked rotatably on bearings 16, 16' by means of two connection parts designed as pivot plates 15, 15' around pivot axes designed as axes of rotation D, D' (see FIG. 7). The bearings 16, 16' are fastened on the bottom or on a fastening element mounted on the bottom, especially a fastening plate 17, which in turn is ordinarily fastened to a fixed foundation. The function of the rotatable bearing is described in detail later in reference to FIG. 7. However, more or fewer plug connections can also be provided on the feed device.

The connection device 13 has a manipulator 18, which is designed for gripping and active movement of the connection plug 6 and to produce a connection of the connection plug 6 to the plug connection 14. The manipulator 18 has a manipulator base 19, on which a lower manipulator arm 20 with four lower partial arms 21, 21', 21" are linked, two of which are fully visible and one partially concealed in FIGS. 2 to 6. The manipulator arm 20 can be moved via a lower manipulator drive 22, which rotates the partial arm 21" and preferably also the partial arm 21'.

On its other upper end, the lower four partial arms 21, 21', 21" are then connected with a cross-like connection piece 23 so that the partial arms 21, 21', 21" form a first parallelogram guide. An upper manipulator arm 24 is also connected to it, which is linked rotatably using two upper manipulator arms 25, 25' to two other joint connections of the connection piece 23 offset cross-like to the joint connections of the roller partial arms 21, 21', 21". On their front upper ends the manipulator arms 25, 25' are again connected to each other parallelogram-like. The upper partial arm 25' can be rotated around its lower pivot axes via an upper manipulator drive 26.

Figure 4:
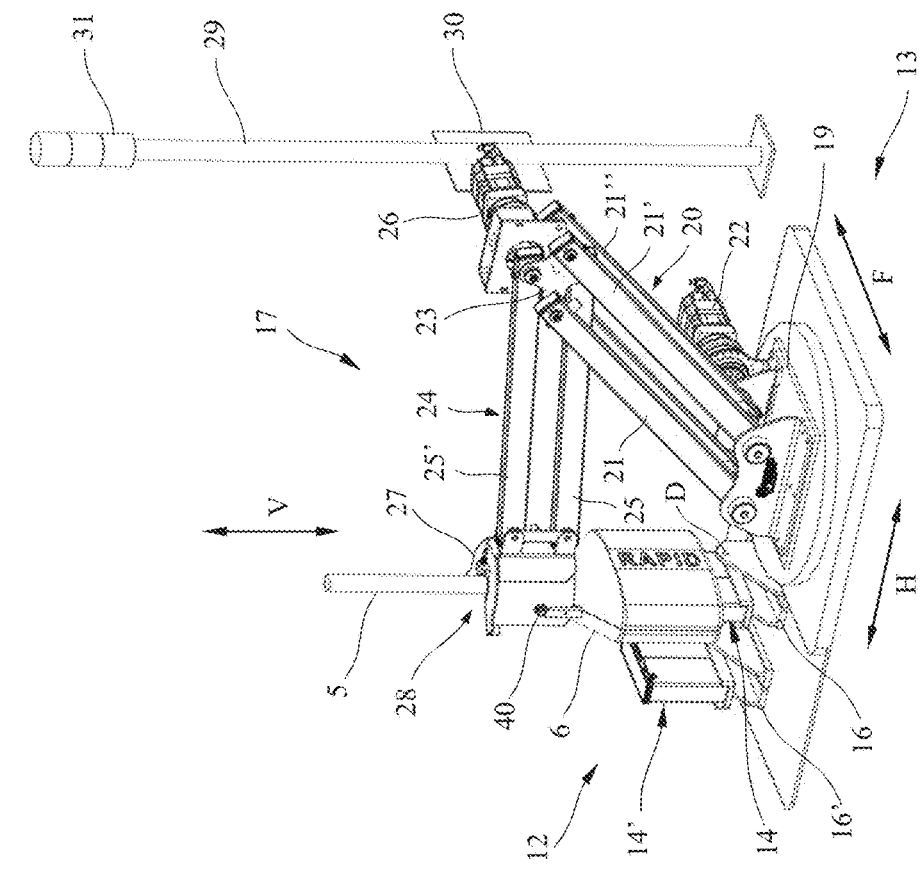
FIG. 4 shows the manipulator arm from FIG. 3 during connection of the connection plug to a plug connection of a feed device.

On its front upper end, the upper manipulator arm 24 has a gripping device 27 for the connection plug 6 in order to be able to position the connection plug 6 properly relative to plug connection 14 by means of manipulator 18 only movable in the horizontal feed direction H and vertical feed direction V. The gripping device 27 has a funnel-like introduction opening 28, in order to be able to reliably grip and move the connection plug 6, as shown in FIG. 4. This is explained in further detail later.

In order to be able to position the connection plug 6 relative to the manipulator 18 that is only movable in the horizontal feed direction H across the travel direction F of crane 1 so that the gripping device 27 can reliably grip the connection plug 6, a signal mast 29 is mounted next to the connection device 13. The signal mast 29 has a position element designed as an identifying plate 30. The sensor unit 11 arranged on the right lower end of the roller bend 8 in FIG. 2 detects whether the identifying plate 30 is situated relative to sensor unit 11 in a position in which the manipulator 18 can grip the connection plug 6. If yes, the gripping process is initiated by the manipulator 18, which can compensate for different distances in the horizontal feed direction H within a certain range.

For example, it can be checked for this purpose whether the identifying plate 30 is situated in the measurement range of sensor unit 11 or not. The identifying plate 30 can have a large-surface QR code and the sensor unit 11 a very narrow measurement range within which the QR code must lie. As an alternative or in addition, the identifying plate 30 can also have a reflector film having known dimensions and position, in which case the distance to it is then preferably measured using sensor unit 11. As soon as the beginning of the reflector film is detected, the position of the crane 1 and the cable guide device 7 relative to manipulator 18 can be determined from the known dimensions. The distance measurement can also be used to be able to rapidly grasp the connection plug 6 and allows the most precise possible spacing by the manipulator 18.

Since the insertion opening 28 is funnel-shaped, a certain offset of the connection plug 6 in travel direction F can also be compensated in the event of not entirely exact positioning of the crane 1 relative to the insertion opening 28.

In order to inform the driver or human operator of the crane 1 of a proper positioning and an optionally reliably produced connection between connection plug 6 and plug connection 14, a signal light 31 having the conventional traffic signal colors red, yellow and green is mounted to be visible on the upper end of the signal mast 29. Red then signals that no connection has yet been made, yellow signals the production of the connection and green the produced connection and withdrawal of the manipulator 18, i.e., release for further travel. However, other colors or light signals, like slow and rapid blinking, etc. can also be used. As an alternative, it can also be indicated to the driver by the signal light 31 whether a plug connection 14, 14' is still free or not on the feed device 12: red then indicates no free plug connection and green a free plug connection, whereas yellow indicates that a connection is being made on the feed device.

The process of gripping and connection of the connection plug 6 with the plug connection 14 is described subsequently as an example with reference to FIGS. 3 to 6.

Figure 3:
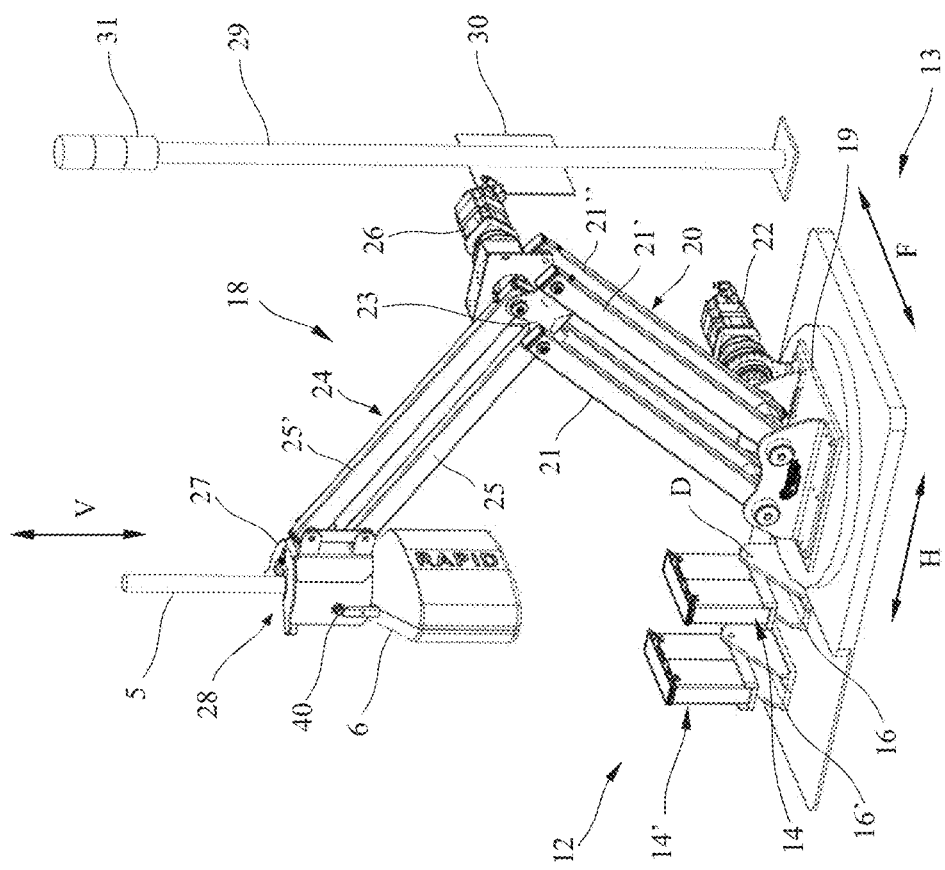
FIG. 3 shows a schematic three-dimensional view of a manipulator arm of the connection device from FIG. 2 during grasping of a connection plug.

The crane 1 in FIG. 3 is already moved into the favorable position relative to connection device 13 and the manipulator arm 18 has already grasped the connection plug 6 with the gripping device 27. The manipulator 18 with the gripping device 27 travels beforehand to the line cable 5 above the connection plug 6 and encloses it. The gripping device 27 then travels from above over an upper cylindrical gripping part 38 of the connection plug 6 to a not recognizable stop at the bottom until a gripping stop fastens the connection plug 6 on the gripping device 27.

The gripping part 38 has a centering funnel 39 readily apparent in FIG. 2, in which centering mandrels 40 arranged opposite each other engage in the funnel-like insertion opening 28. The centering mandrel 40 indicated in its position on the outside on gripping device 27 is depicted in FIG. 2. Because of this a situation can advantageously be achieved where the connection plug 6 held by the gripping device 27 is aligned so that it can be properly mounted on one of the plug connections 14, 14'.

Figure 6:
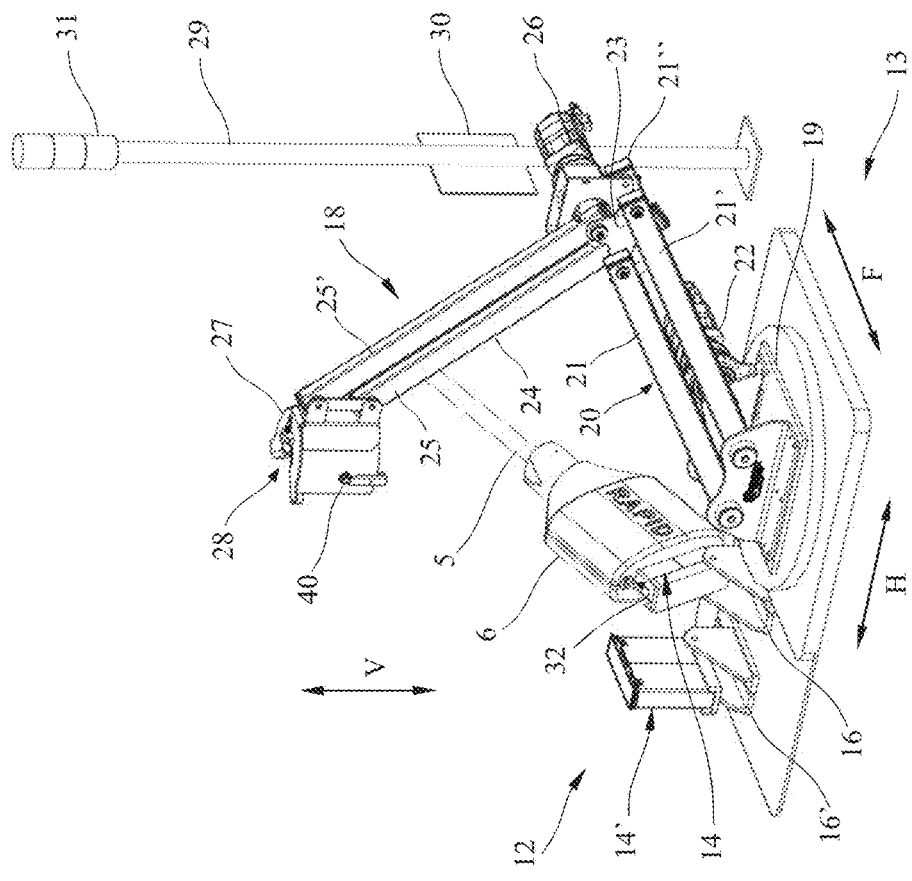
FIG. 6 shows the view from FIG. 5 with the plug connection pivoted from the rest position by movement of the crane.

The manipulator 18, as shown in FIG. 3, by rotation of the upper manipulator arm drive 26 and optionally the lower manipulator arm drive 22, then moves the connection plug 6 over the plug connection 14 so that a connection plug opening 32 of the connection plug 6 only recognizable in FIG. 6 is flush with the outside contour of the plug connection 14. The connection plug 6 is then pushed over the plug connection 12 by means of the manipulator 18 and releasably connected with a plug lock not shown in detail here and further described later in detail, as is recognizable in FIG. 4. An electrical connection between an electrical power supply of the container stacking site connected to the plug connection 14 and the connection plug 6 of the crane 1 and therefore its electrical supply network, is then produced via the plug connection 14. A data connection, for example, an electrical or optical data transmission can also be produced, for example, by providing releasable plug connections.

Through the double parallelogram guiding of manipulator 18 it can then be advantageously ensured that the gripping device 27 does not alter its slope angle with reference to the plug connection 14 during its movement. The connection plug 6 moved by the gripping device 27 is therefore not tilted from the ideal position depicted in the drawing so that the line cable 5 is not bent very greatly or even kinked. Instead of parallelogram guiding, the manipulator 18, however, can also be configured differently in order to secure it, for example by using a robot having at least one robot arm and a gripping device arranged on it, or in some other manner familiar to one skilled in the art. For example, two linear telescoping arms or extensions, one horizontal and one vertical, can also be used.

Figure 5:
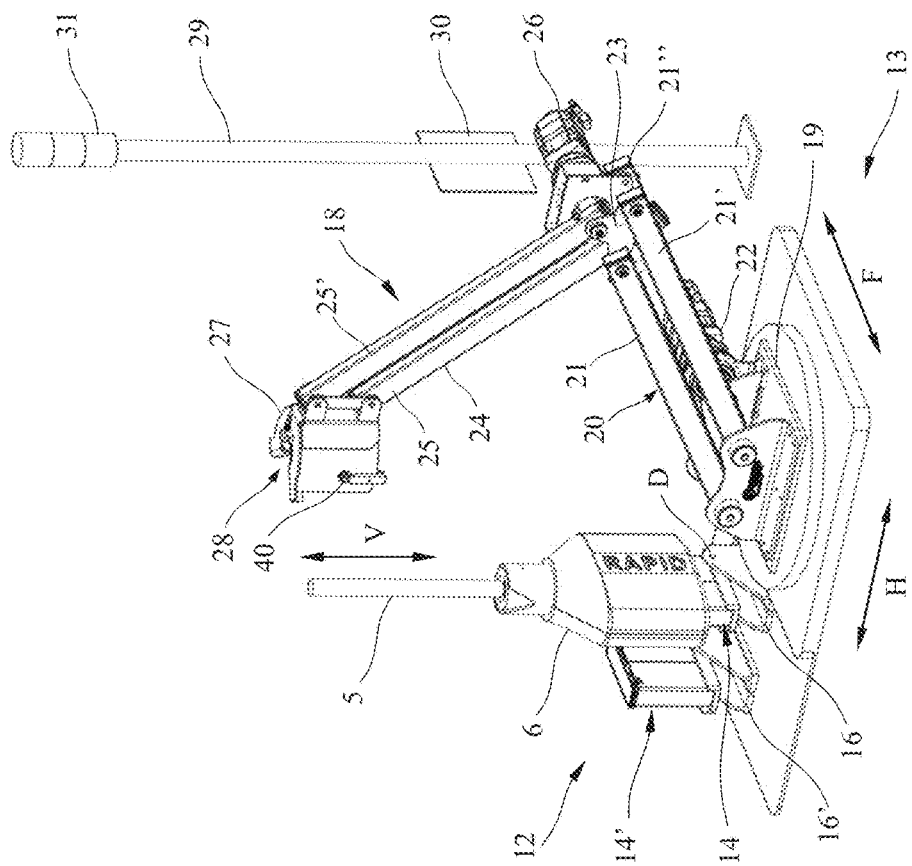
FIG. 5 shows the manipulator arm from FIG. 3 in a withdrawn position after loosening of the connection plug.

As shown in FIG. 5, the gripping lock of the gripping device 27 is then released and the manipulator 18 moved away from crane 1 by rotation of the manipulator arm drives 22, 26 from the line cable 5 and connection plug 6 according to FIG. 5 on the right. It is then indicated with the signal lights 31 for the human operator of the crane 1 that the connection between connection plug 6 and plug connection 14 has been made and the manipulator 18 is free and the crane 1 can therefore move away from the connection device 13 and assume its normal operation. In the present practical example, the connection device 13 is arranged at the entry of a driving lane for the crane 1 so that travel along the container stacking site in FIGS. 2 to 6 occurs obliquely to the top right. The connection device 13, however, can also be arranged at another location.

As is known from the prior art, it is important for the longest possible lifetime of the line cable 5 that it is as seldom as possible bent beyond the admissible minimal bending radius and at best not at all, let alone fully kinked.

An aspect of the present invention therefore has the task of permitting improved guiding of the line cable 5 connected to a feed device and especially of reducing the hazard of kinking or unduly sharp bending of the line cable 5 during movement of the electrical load, especially crane 1.

For this purpose, as is readily apparent in FIGS. 6 and 7, the invention proposes that the plug connections 14, 14' are arranged rotatable around an axis of rotation D or D' running across the travel direction F and preferably parallel to the ground. If the crane 1 having line cable 5 then travels from the connection position to the right in FIG. 2 in travel direction F, as shown in FIG. 6, the line cable 5 is not curved or hardly bent or kinked because the plug connection 14 is pivotable in the travel direction F but runs essentially straight from the plug connection 14 and in the pulling direction of the line cable 5 to cable guide device 7. If the crane 1 then moves farther from the feed device 12 and the connection device 13, the line cable 5 is laid bit by bit in known fashion next to the travel route of the crane 1. In contrast to the prior art, in the present embodiment, however, the plug connection 14 is tilted to the extent that the connection plug 6 is sloped slightly downward and the line cable 5 is laid on the ground coming from the connection plug 6 having almost no or only slight bending.

The line cable 5 during the entire laying process is therefore only slightly bent so that mild line guiding is made possible, the lifetime of the line cable 5 is lengthened and the reliability of the system is therefore increased.

Use of the rotational functionality of the plug connection 14 depicted in the drawings and described above is also possible in systems with a permanent connection of the line cable 5 to the feed device 12 so that even then the advantages of the improved line cable guiding are obtained.

The detail of the connection device 13 shown in FIG. 7 shows an additional plug connection 14″, which corresponds in function, however, precisely to the plug connection 14, 14′. Since they are identically designed, the invention is preferably explained below referring to the plug connection 14. The two other plug connections 14′, 14″ and their parts are denoted having the corresponding reference numbers as in plug connection 14, if necessary supplemented by one or two apostrophes.

The plug connection 14 has a plug connection housing 33, in which the electrical connection elements for an electrical power connection and/or a data connection (not visible) are arranged.

In order to avoid penetration of moisture, dust, water, rain, etc. from above onto the electrical connection elements, the plug connection housing 33 in its rest state depicted in FIG. 2 has a cover 34 on the upper end, which is joined rotatably to the plug connection housing 33 via a pair of hinges 35. The cover 34 is held in the closed position under the action of a spring in a known fashion and moved back from an open position to the closed position.

In order to be able to automatically open the cover 34 during positioning or mounting of the connection plug 6, opening tabs 36 connected to cover 34 are provided on the side of the hinge 35 extending outward above the plug connection housing 33. The corresponding stop in the connection plug 6, especially the corresponding edge of the connection plug opening 32, forces the opening tabs 36 downward to the plug connection housing 33 when the connection plug 6 is positioned and inserted so that the cover 34 moves upward. The electrical connection elements of the plug connection 14 are released by this. The connection plug 6 is then moved further downward and the male electrical and/or data connection elements situated in the connection plug 6 can be connected to the corresponding, here female, connection elements in plug connection housing 33 protected against external influences, like wind, water, rain, etc. Cover 34 also prevents operating personnel or unauthorized persons from gaining direct and unprotected access to the connection elements, especially the electrical connection elements.

In order to keep the pivot plate 15 and therefore the plug connection 14 in the rest position depicted in FIGS. 2 to 5, a stop 37 depicted in FIG. 7 can be provided on the bearing 16 for pivot plate 15. The plug connection 14 in the depicted embodiment then remains in the rest position as a function of weight. In an advantageous embodiment (not shown) a spring force can also act on the pivot plate 15 in order to return the plug connection 14 to its rest position when it is not connected to the connection plug 6.

In an alternative embodiment of the connection device 13, which can also preferably be arranged along a travel route of crane 1, the plug connections 14, 14′ are advantageously designed so that they can rotate in both directions of the travel direction F around the axis of rotation D preferably arranged in the center, i.e., laying of the line cable 5 both on one side and the other side of the plug connections 14, 14′ can occur. A retaining device is also advantageously provided here, which makes sure that the unconnected plug connection advantageously faces upward in a direction favorable for connection of the connection plug 6. The plug connection 14 can then be preferably locked against the bottom plate 17 until the connection plug 6 is securely connected to the plug connection 14. Such an embodiment as described later is self-evident to one skilled in the art.

FIGS. 8 to 28 show alternative embodiments of parts of the power transmission system depicted in principle in FIG. 1, especially with modified feed device 112, connection device 113 and cable guide device 107. Since these parts are designed the same or similarly as in the embodiment depicted in FIGS. 2 to 7, corresponding parts having corresponding reference numbers, each supplemented by the number "100", are used. Mostly the differences are also taken up so that comments concerning corresponding parts in the first embodiment according to FIGS. 2 to 7 also apply accordingly to the alternative embodiments of FIGS. 8 to 28 and vice versa, unless otherwise stated.

Figure 8:
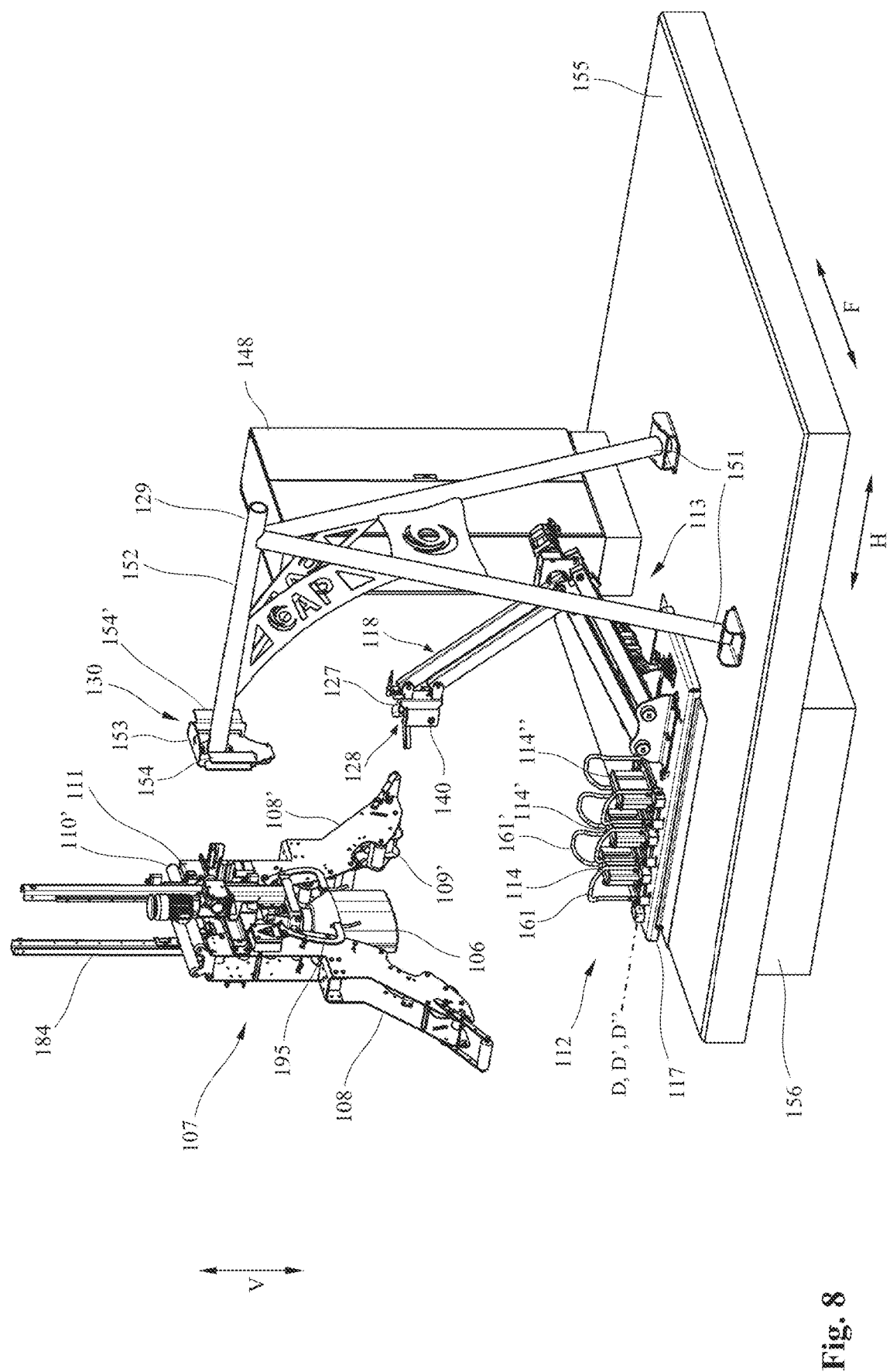
FIG. 8 shows a schematic three-dimensional of a cutout from FIG. 1 having an alternatively configured second connection device according to the invention for gripping of a connection plug.
Figure 16:
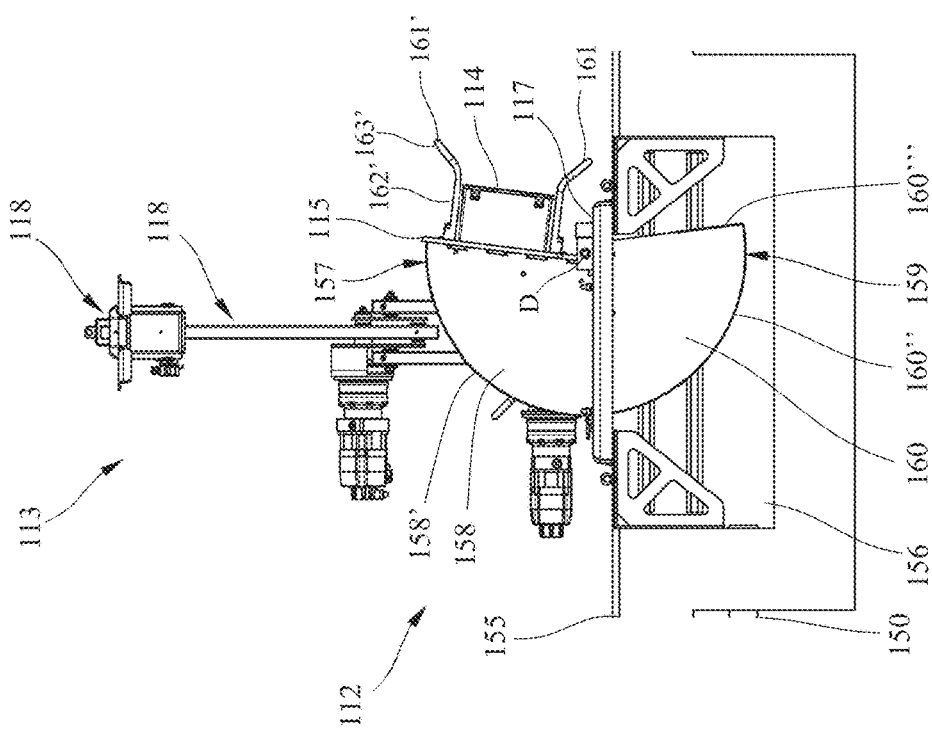
FIG. 16 shows a side view of the partially cut-out depiction of the feed device and the connection device from FIG. 14 from the top left in FIG. 14.

A switchbox 148 is also shown in the feed device 112 depicted in FIG. 8, in which the electrical power supply unit is located and to which the supply and data cables 149 indicated in FIG. 16 lead, which pass through cable lead-throughs 150, 150′, 150″ (see FIGS. 16 to 18) in the switchbox 148.

The method of the function of the power transmission system depicted in FIGS. 8 to 13 corresponds in principle to that shown in FIGS. 2 to 7. The line cable 5 in FIG. 8 that has a connection plug 106 is again positioned relative to the manipulator 118 so that a gripping device 127 can grip the connection plug 106 during movement in the horizontal feed direction H. The connection plug 106 is then released somewhat so that the manipulator 118 can grasp it in the manner described above using the gripping device 127 and bring it into the position provided for mounting on the plug connection 114. The plug connection 114 is designed like the plug connection 14 and in particular has a plug connection housing with a movable cover.

Figure 9:
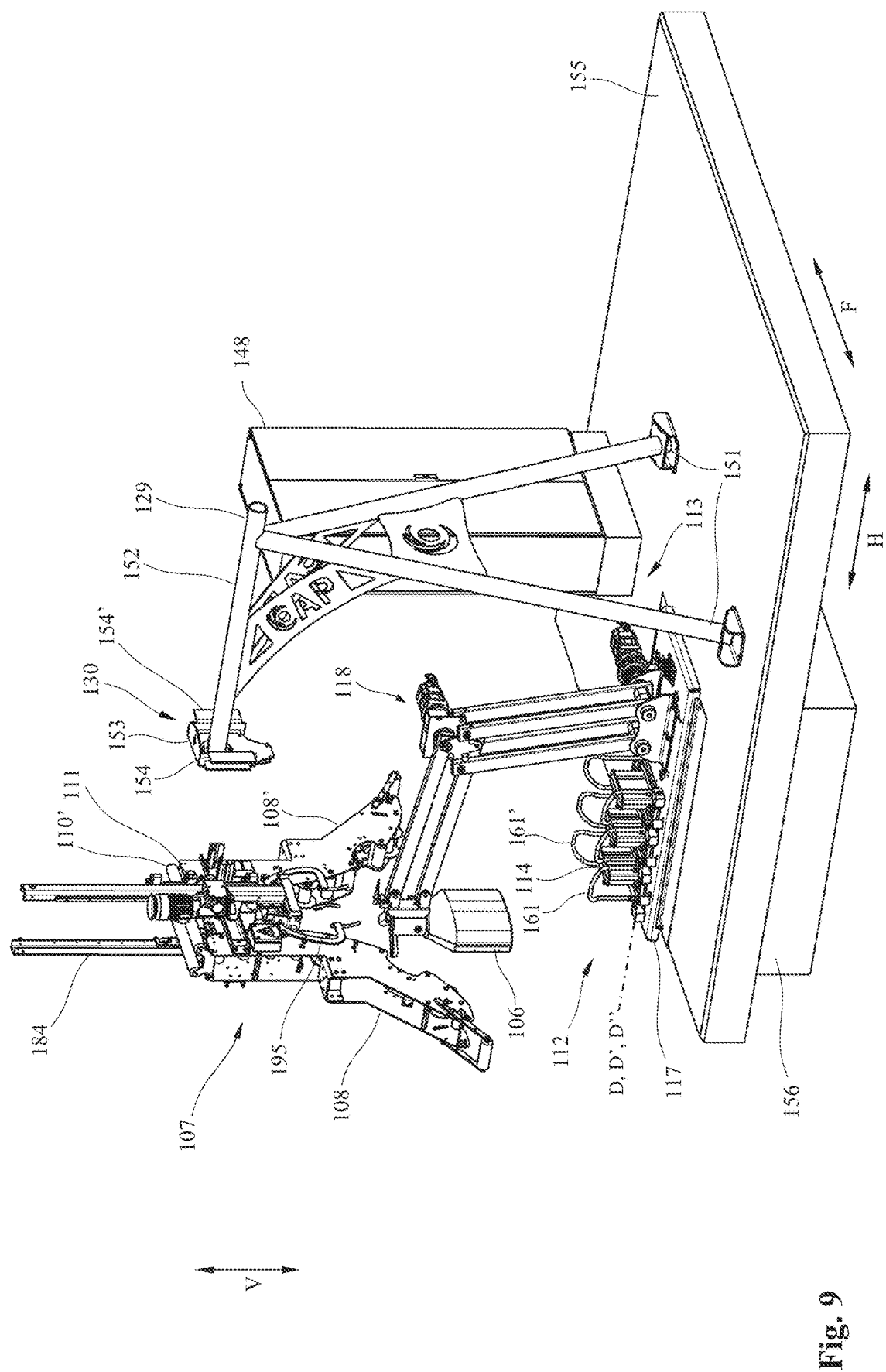
FIG. 9 shows a schematic three-dimensional view of the manipulator arm of the connection device from FIG. 8 during gripping of the connection plug.
Figure 10:
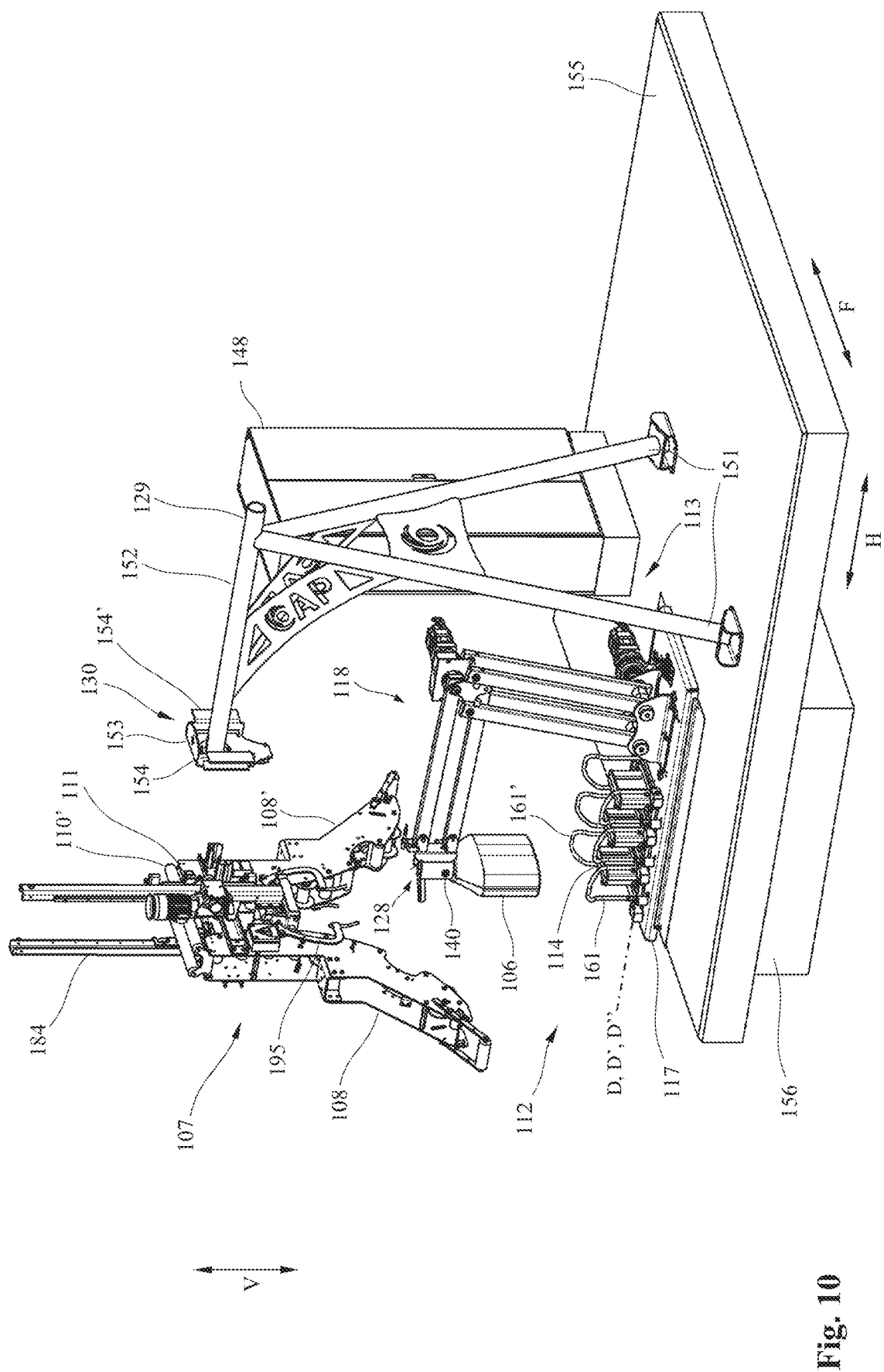
FIG. 10 shows the view from FIG. 9 showing the manipulator arm from FIG. 9 during supply of the connection plug to a plug connection of the feed device.
Figure 11:
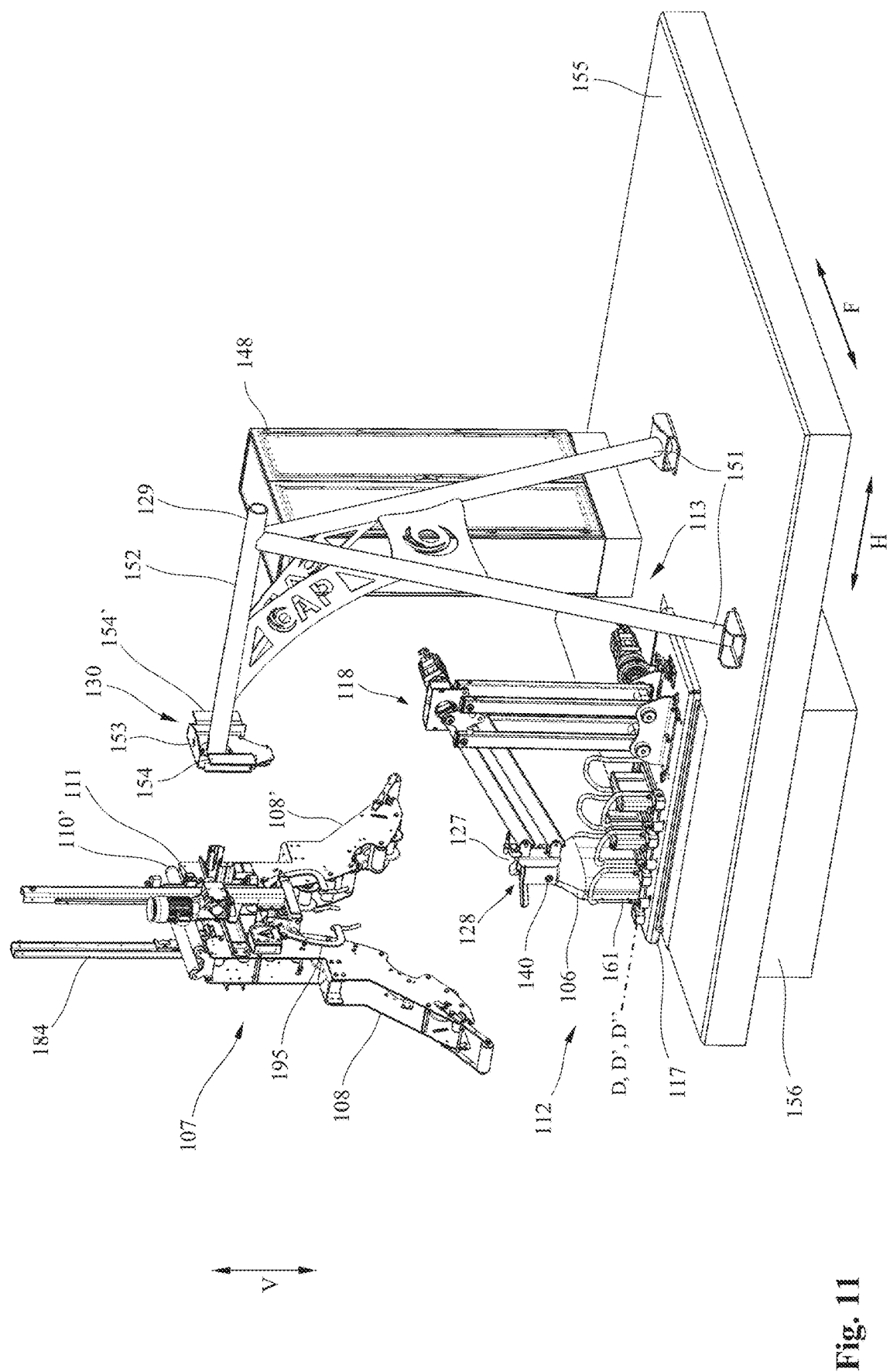
FIG. 11 shows the view from FIG. 9 showing the manipulator arm from FIG. 9 during connection of the connection plug to the plug connection.
Figure 12:
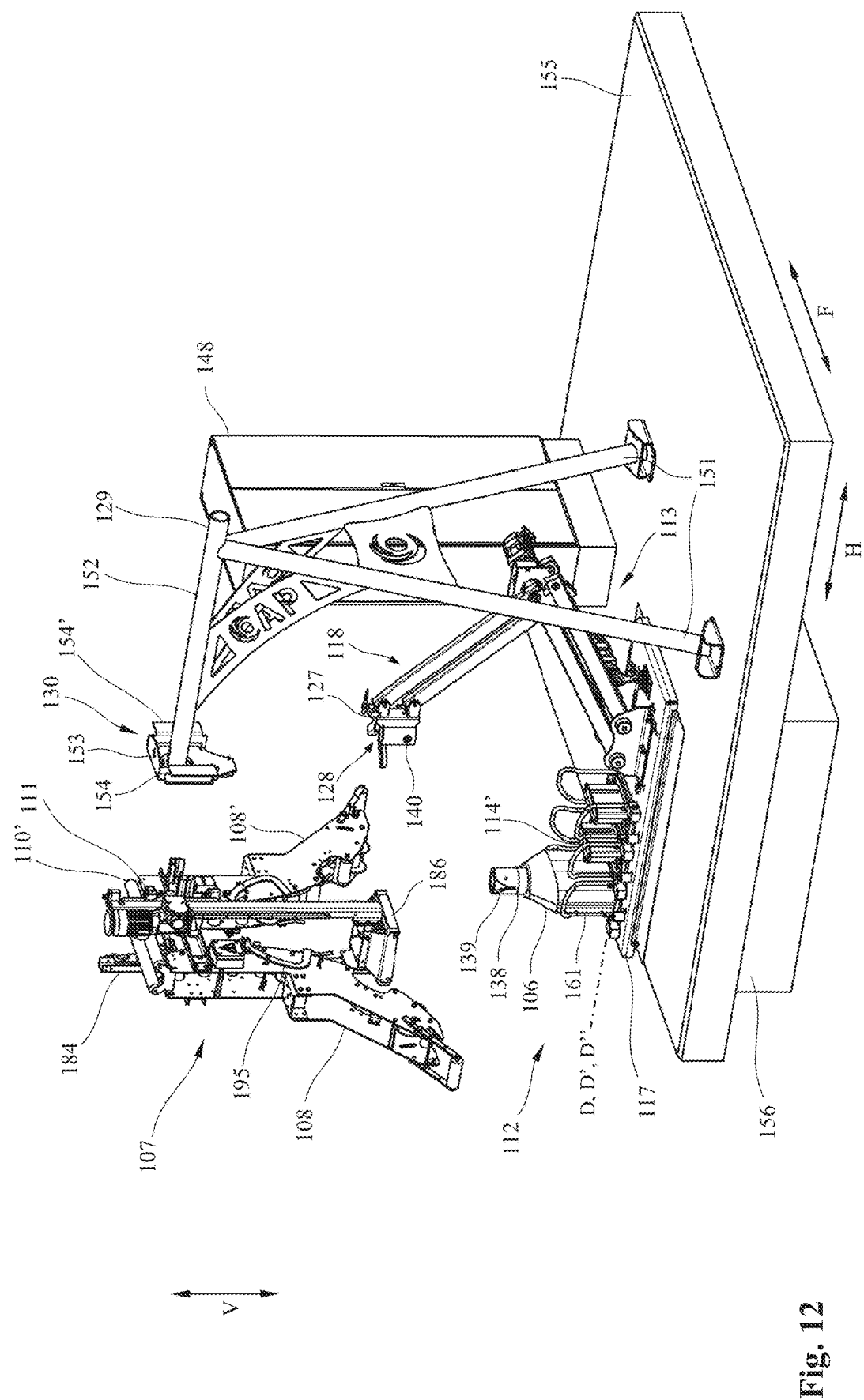
FIG. 12 shows the view from FIG. 9 showing the manipulator arm from FIG. 9 in a withdrawn position after loosening of the connection plug.

The connection plug 106 is then brought from the position in FIG. 9 to a plug connection 114, on which it is mounted in the above described manner as shown in FIGS. 10 to 11. The connection plug 106 is again locked against the feed device 112, which is explained subsequently in detail in reference to FIGS. 19 and 20. As shown in FIG. 12, the manipulator 118 can then be released from the connection plug 106 and brought to its rest position.

Figure 13:
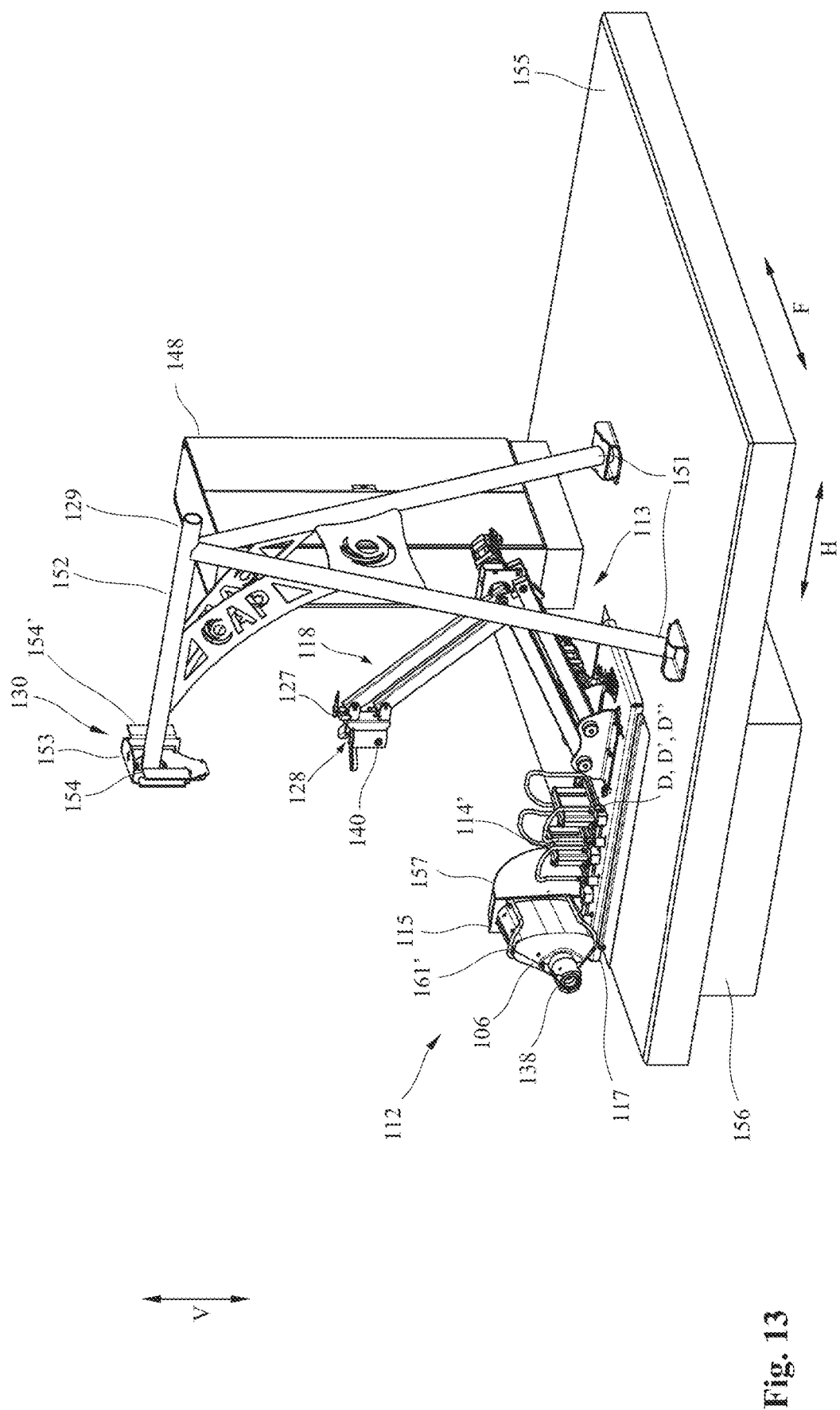
FIG. 13 shows the view from FIG. 12 showing the plug connection pivoted from the rest position.

It is shown in FIG. 13 that the connection plug 106 with plug connection 114 is again pivoted around the axis of rotation D from the rest position depicted in FIG. 12 by movement of the crane 1 (not shown).

The alternative signal mast 129 shown in FIGS. 8 to 13 then has two oblique support feet 151 on which an alternative identifying plate 130 is carried on the free front end of a boom 152. An alternatively designed sensor 111 is arranged accordingly on the cable guide device 107, which is used to detect identifying plate 130. A distance sensor 111 with a narrow measurement range can then advantageously be used. The identifying plate 130 advantageously has a front central area 153 in the horizontal feed direction H and rear edge areas 154, 154' connected on both sides to it in the travel direction F to the rear relative to the central area 153 in the horizontal feed direction H, i.e., away from crane 1. The identifying plate 130 preferably has a reflector, for example, a reflector film in order to reflect the signal emitted by the distance sensor 111 as well as is possible. However, the identifying plate 130 from the practical example described further above can also be used.

In order to position the connection plug 106 in the center relative to the central area 153, the distance sensor 111 initially detects the distance to one of the two rear edge areas 154, 154' during travel in travel direction F from the right or left in FIG. 8. If it then travels farther in travel direction F toward the central area 153, it detects a sudden distance reduction and therefore the beginning of the front central area 153 on spatial detection of the central area 153. The travel path still necessary in travel direction F can then be determined via the known geometric dimensions, especially the extent of the central area 153 in travel direction F, in order to position the connection plug 106 as exactly as possible on the gripping device 127.

In this way positioning of the connection plug 106 relative to manipulator 118 can be simplified, in which case an active sensor 111 can be arranged only on the cable guide device 107, whereas a passive element can be involved in the identifying plate 130. The identifying plate 130 can then also have other configurations that permit detection of a clearly defined change in distance by sensor 111. For example, the central area can be offset rearward and the edge areas closer to crane 1. In particular, in a simplified embodiment the edge areas 154, 154' can be left out so that only the transition from the poorly reflecting environment or the environment not reflecting at all to the readily reflecting area of the identifying plate need be determined. The central area 153 and the edge areas 154, 154' connected to it, whether they are offset relative to each other in the horizontal feed direction H or not, can also have different reflecting properties so that a distinction is made possible by the size of the return signal intensity.

The embodiment according to FIGS. 8 to 28 is also further distinguished from the embodiment in FIGS. 2 to 7 by the configuration of the pivotable plug connections 114. The differences are again taken up subsequently, whereas the comments made above concerning FIG. 1 apply accordingly for the same or similar components. Here again, owing to the identical design of the plug connections 114, 114', 114" the invention is further described by a reference to plug connection 114, unless otherwise stated. These comments also apply accordingly for the other plug connections 114', 114".

Figure 20:
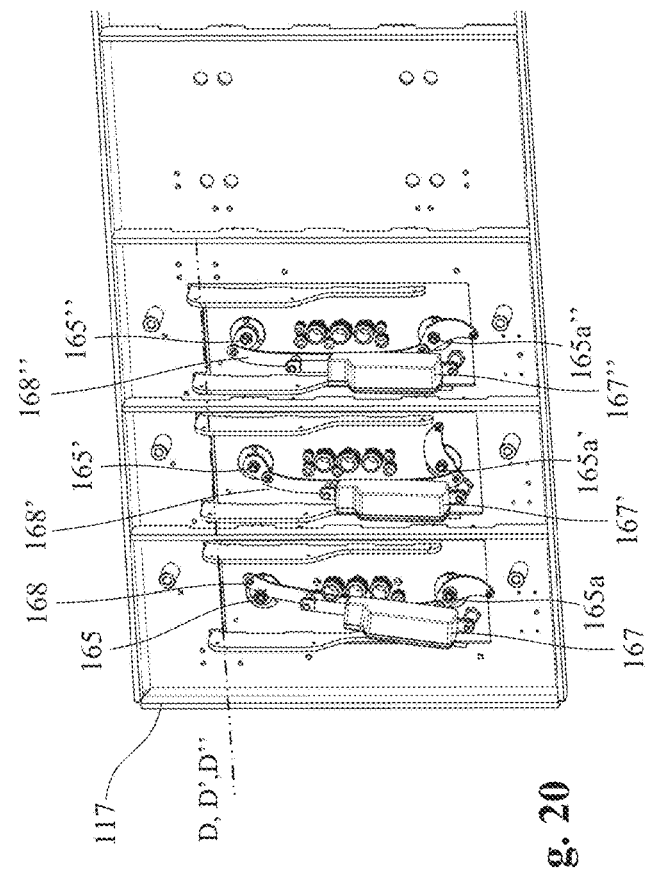
FIG. 20 shows a schematic detail view of the plug locking from FIGS. 18 and 19 from below.

As follows from FIGS. 16 to 18, the plug connection 114 is again mounted with a pivot plate 115 rotatable around an axis of rotation D around a bearing 116 on a fastening plate 117. The plug connection 114, however, could also be arranged directly rotatable on the fastening plate 117. The axis of rotation D then runs essentially horizontal and in the direction of the horizontal feed direction H of the manipulator 118. The fastening plate 117 is arranged via a depression 156 provided in the foundation 155. As is apparent in FIGS. 16 and 18, the cable lead-throughs 150 coming from the switchbox 148 discharged in depression 156, in which the power supply and data cables 149 indicated in FIG. 16 run. These cables 149 each extend through a connection opening arranged beneath the plug connection 114 in the bottom plate 117 to the bottom of the plug connections 114 where they are electrically connected to the female connection elements of the plug connection 114, as indicated in FIG. 20.

A first protective enclosure 157 movable with pivot plate 115 around the axis of rotation D is provided on the bottom of plug connection 114, especially the pivot plate 115 in order to properly guide the cables 149 arranged on its bottom and seal them off relative to the surroundings during pivoting of the plug connection 114, among other things, also for contact protection reasons. Identically designed, the circular sector side wall 158, 158' measuring about 100°, as well as a front wall 158" of the first protective enclosure 157 connecting the circular arc sides of the side walls 158, 158' are connected on the bottom of pivot plate 115, as is readily apparent in FIGS. 15 and 17. An additional face between the side walls 158, 158', front wall 158" and pivot plate 115 remains free and forms an opening 158''' visible in the front in FIG. 18 for the cables 149 coming from the cable lead-through 150.

Figure 14:
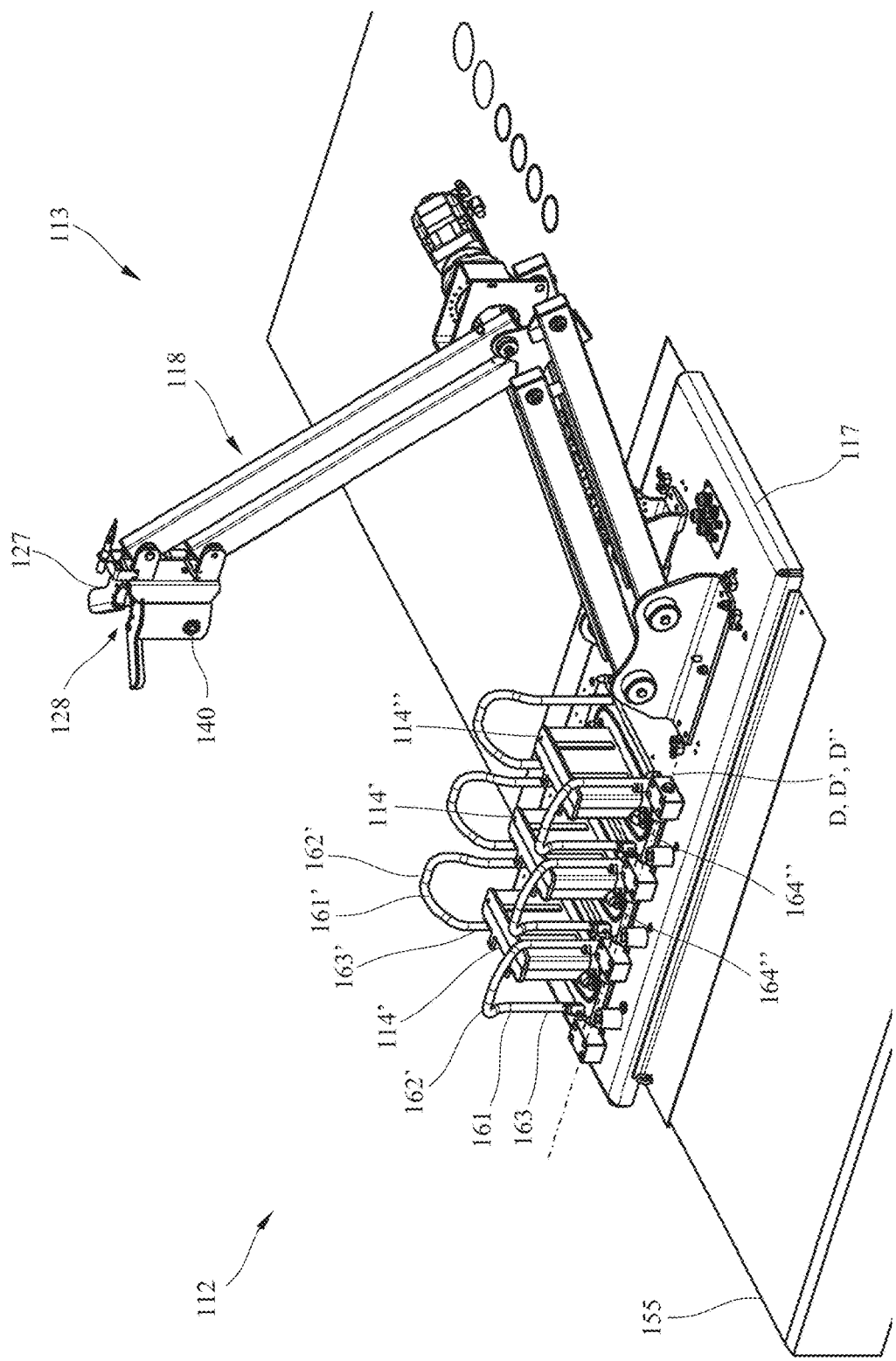
FIG. 14 shows an enlarged detail view of the feed device and the connection device from FIG. 9 having the plug connection in the rest position.

The first protective enclosure 157 runs in a second somewhat larger but correspondingly designed second protective enclosure 159 arranged fixed on the bottom of the bottom plate 117 with circular-sector side walls 160, 160', a front wall 160" connecting them, as well as a front opening 160''' for the cables 149 coming from the cable lead-through 150. However, as an alternative, the second protective enclosure 159 could be dispensed with, since the first protective enclosure 157 also offers protection for cables 149 when the pivot plate 115 according to FIGS. 14 and 16 is lowered.

Figure 15:
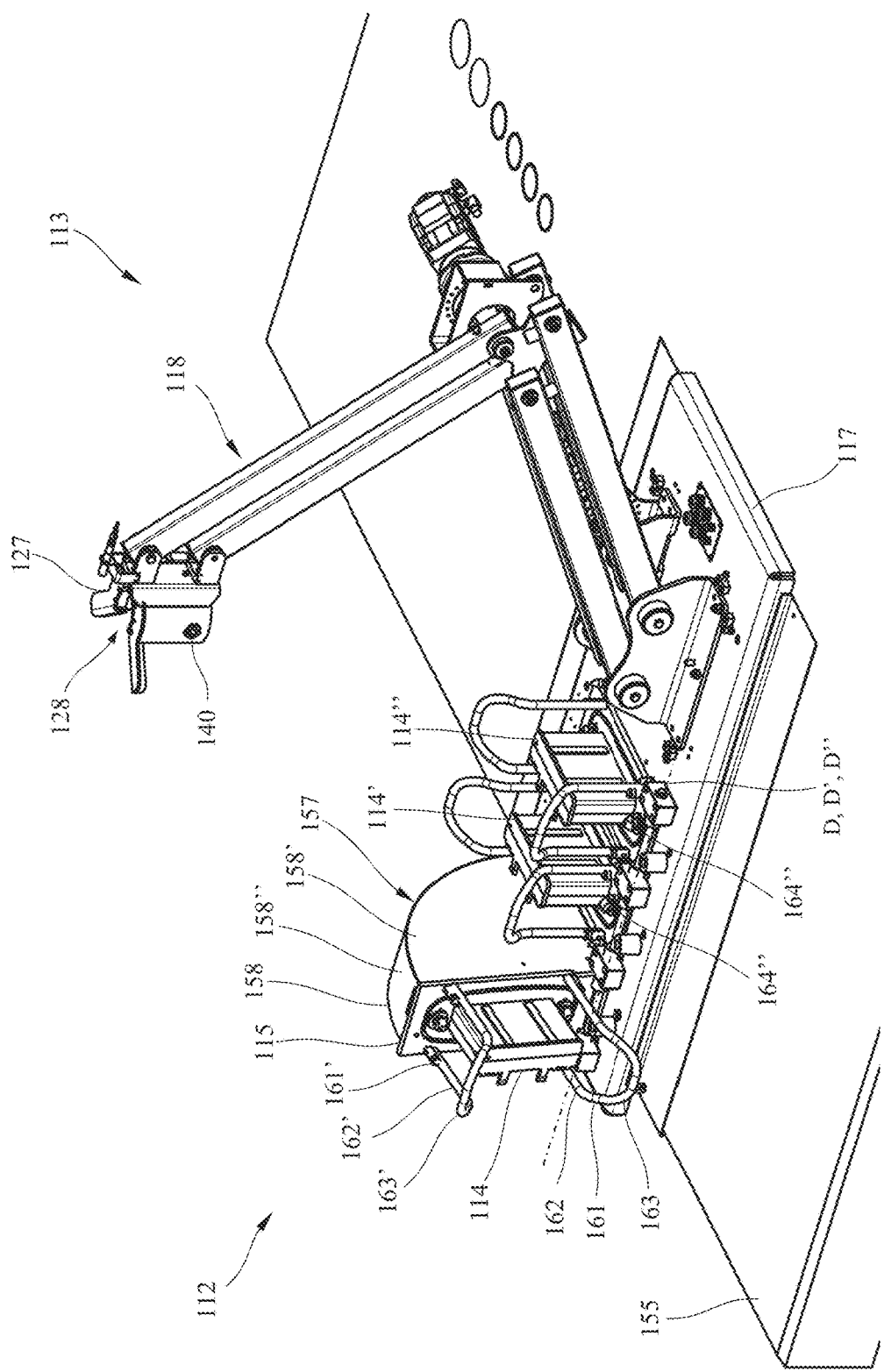
FIG. 15 shows a detail view from FIG. 14 of the plug connection according to FIG. 13 pivoted from the rest position.
Figure 17:
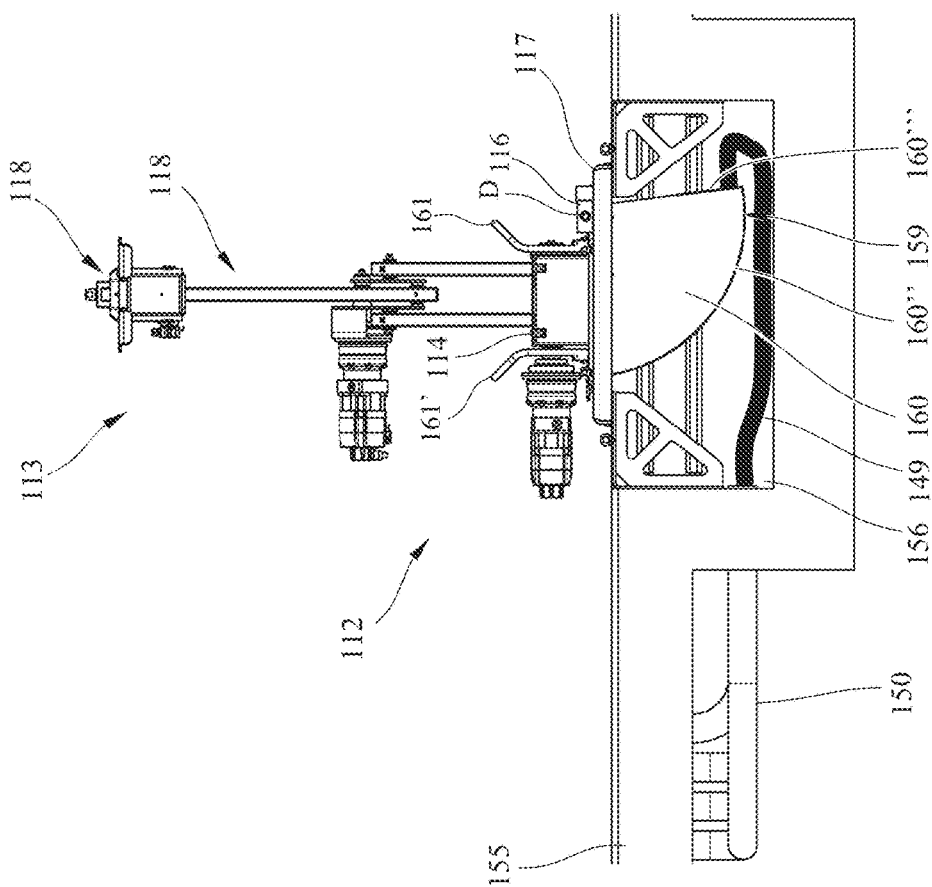
FIG. 17 shows the side view from FIG. 16 of the plug connection pivoted out from the rest position according to FIG. 15.
Figure 18:
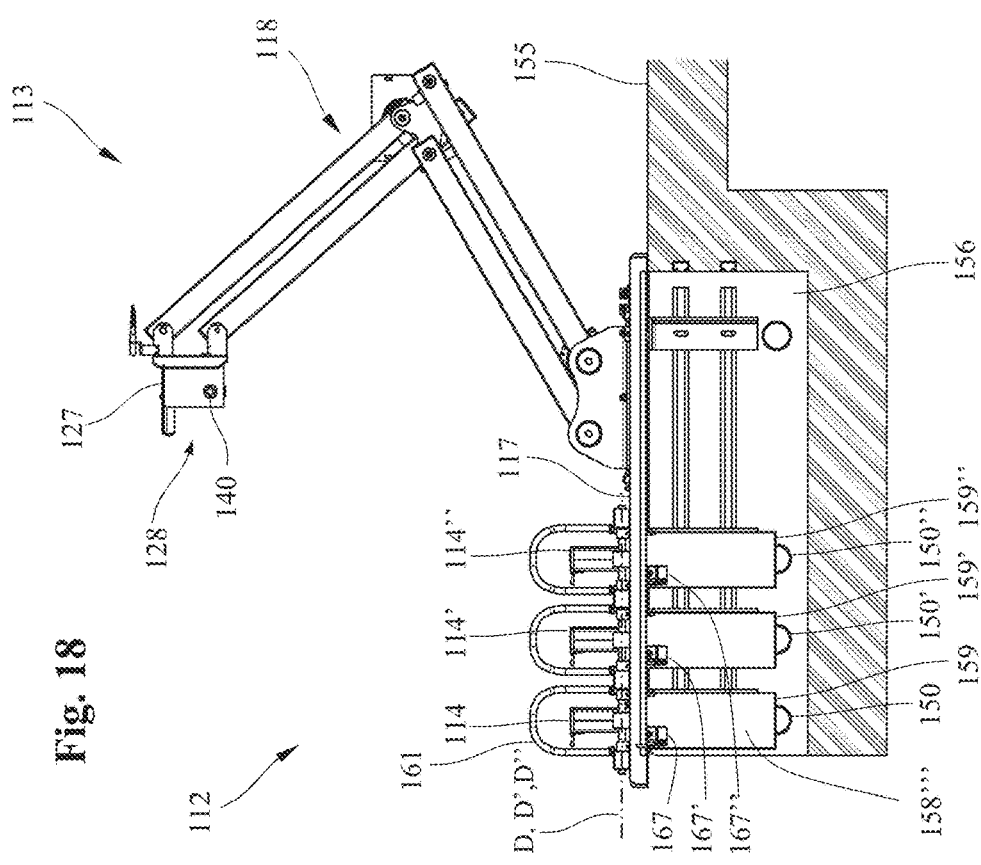
FIG. 18 shows the side view of the partially cut-out depiction of the feed device in connection device from FIG. 14 from the bottom left in FIG. 14.

The cables 149 are then dimensioned in length so that the fully folded-back position of the plug connection 114 depicted in FIGS. 15 and 17 is possible. In the fully pivoted-in position of the plug connection 114 shown in FIGS. 14 and 16, the excess cable length of cable 149 is folded together preferably within the protective enclosures 157, 159. Since the cables 149 are fully enclosed by them in the region of the protective enclosures 157, 159, the cables 149 can be reliably guided during pivoting of the plug connection 114 so that neither damage to the cables 149 nor hampering of movement of the plug connection 114 need be feared. To guide cables 149 an energy chain (not shown) can preferably be used, which runs on the bottom of depression 156 and then runs upward in an S-shape in FIG. 17.

In order to be able to further compensate for not fully precise positioning of the connection plug 106 relative to the plug connection 114, a centering clamp 161, 161' is arranged on the narrow front sides of the pivot plate 115. These then have a lower, vertical guide area 162, 162', to which an upper oblique insertion area 163, 163' facing away from the plug connection 114 is connected. When the plug connection 114 is inserted, as shown, for example, in FIG. 13, the vertical guide areas 162, 162' enclose the connection plug 106 so that improved positioning, especially pre-centering of the connection plug 106 on the plug connection 114 can be achieved.

Figure 19:
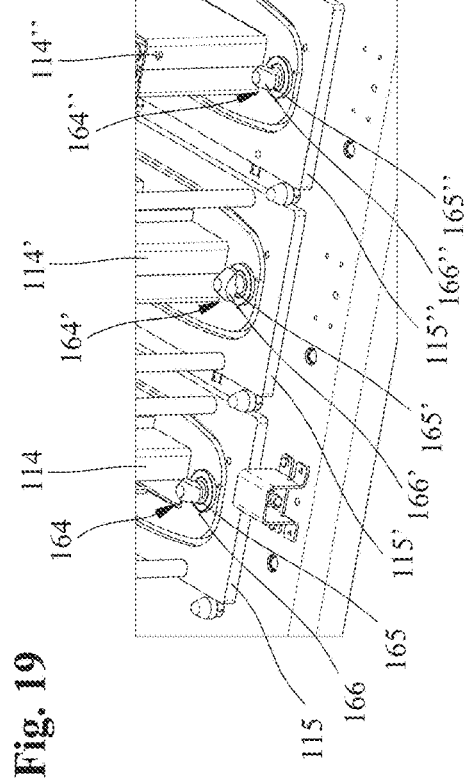
FIG. 19 shows a schematic detail view of a plug locking of the connection device from FIG. 18 obliquely from above.

In order to prevent inadvertent loosening of the connection plug 106 from the plug connection 114, which is especially unfavorable during power transmission, plug locks 164, 164', 164" are provided on the pivot plates 115, 115', 115" on the front sides of the plug connections 114, 114', 114", which are readily apparent especially in FIGS. 19 and 20. Owing to the identical design of the plug locks 164, 164', 164", only the plug lock 164 is described subsequently unless otherwise stated.

The plug lock 164 then has locking pins 165 extending through the pivot plate 115 in the area of the connection plug 106, which protrude upward above the pivot plate 115 and have an elongated locking head 166. Another identically designed locking pin 165a can be advantageously arranged on the opposite face of the plug connection 114, as indicated in FIG. 20.

Figure 24:
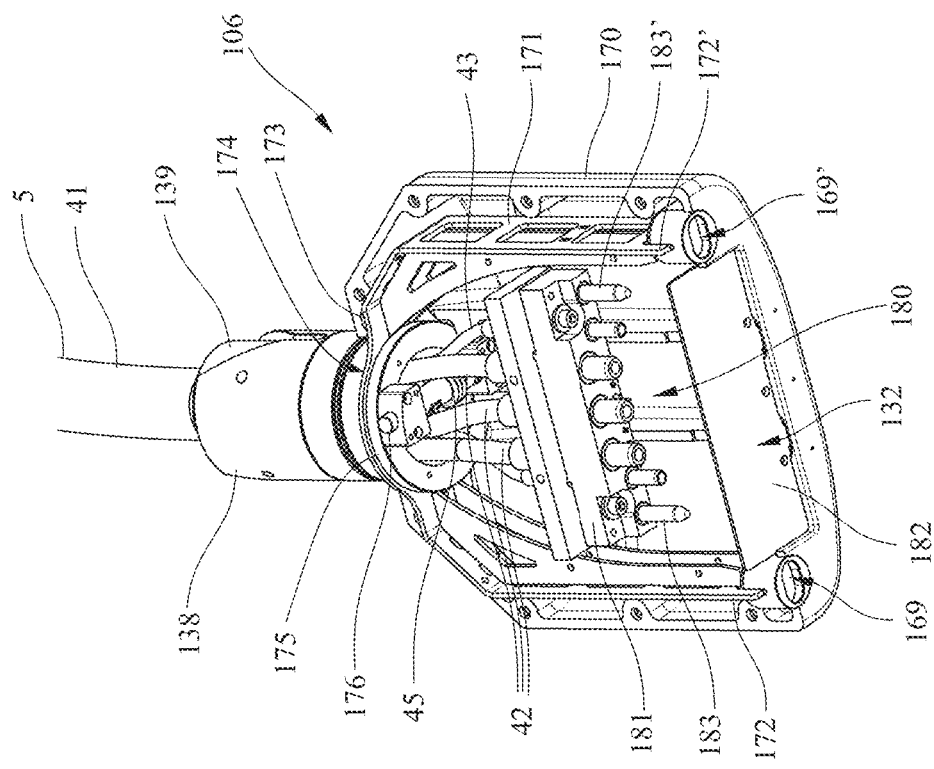
FIG. 24 shows a schematic three-dimensional view of the connection plug from FIG. 22 from a third perspective obliquely from below.

In the opened position the locking head 166 is aligned so that it can be pushed through a corresponding elongated locking opening 169 on the connection plug 106 readily apparent especially in FIG. 24.

When the connection plug 106 is then entirely mounted on the plug connection 114, locking head 166 as well as the locking head of the locking pin 165a (not shown) can still be moved around a closed position rotated advantageously by 90° as depicted in a center plug connection 114' in FIGS. 19 and 20, by means of a locking drive 167 depicted in FIG. 20 via a lever arrangement 168 simultaneously from an open position, as shown in FIGS. 19 and 20 with reference to the outer two plug connections 114, 114". However, a smaller or larger rotation can also optionally be selected in order to reliably lock it. Preferably the locking drive 167 can simultaneously drive the locking pin 165 and the opposite locking pin 165a via a lever arrangement 168.

Instead of a lever arrangement 168, however, a locking drive can also be provided for each locking pin 165, 165', 165" and 165a, 165a', 165a". In principle, only one plug lock could also be provided on each plug connection 114, 114', 114".

The plug lock 164 in the present case additionally serves to fix the pivot plate 115 against the base plate 117 when no connection plug 106 is connected. For this purpose, the lower lever arm in FIG. 20, which drives the lower rear locking pin 165a in FIG. 19 into the fixation position depicted in FIGS. 19 and 20 beneath base plate 117 so that the pivot plate 115 cannot be pivoted away from the base plate 117 around the axis of rotation D running above the base plate 117. In contrast to this fixation of the middle pivot plate 115' is opened so this could be tilted. As an alternative or in addition a mount independent of the plug lock 164, especially a plug connection locking for a releasable fastening of the plug connection 114 in the rest position against the base plate 117 can also be provided until the connection plug 106 and plug connection 114 are securely connected to each other.

A further aspect of the invention proposes that the line cable 5 has a special structure for a better automatic connection. The connection plug 6, 106 can also be advantageously designed specially in order to improve gripping using the manipulator 18, 118 and especially the gripping device 27, 127, and specifically in both of the practical examples described above.

This is described in detail below especially referring to FIGS. 21 to 24.

Figure 21:
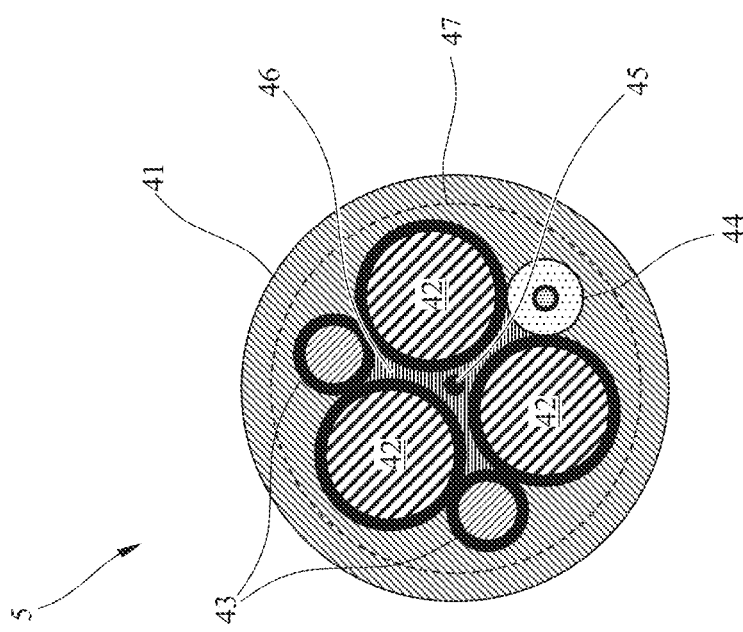
FIG. 21 shows a cross-sectional view through a line cable.

FIG. 21 shows a cross section through a line cable 5, for example, slightly above the connection plug 106. The line cable 5 then has an outer sheath 41 made from a flexible material, for example, rubber, PVC or another elastic plastic. The outer sheath 41 encloses three symmetrically arranged phase conductors 42 for electrical power transmission, a protective conductor divided into two individual conductors 43 as well as a data transmission conductor 44, especially an optical data transmission cable. A flexible but nevertheless robust support device 45 is also provided in the core of line cable 5, for example, an aramid cable or a wire cable. The support device 45 is enclosed by a filler and/or molded parts 46 that exert a support and holding function for the additional conductors 42 to 44 of the line cable 5.

Because of this the sensitive conductors 42 to 44 arranged in the line cable 5 can be unloaded from tension, while the support device 45 serves essentially to take up the longitudinal forces during winding and unwinding of the line cable 5. In addition, another tension relief 47 can be provided in the outer sheath 41, for example, a mesh or fabric embedded in the outer sheath 41.

In order for support device 45 to be able to serve as the tension relief, it is fastened as described below in the partially separated connection plug 106 depicted in detail in FIGS. 22 to 24.

Figure 22:
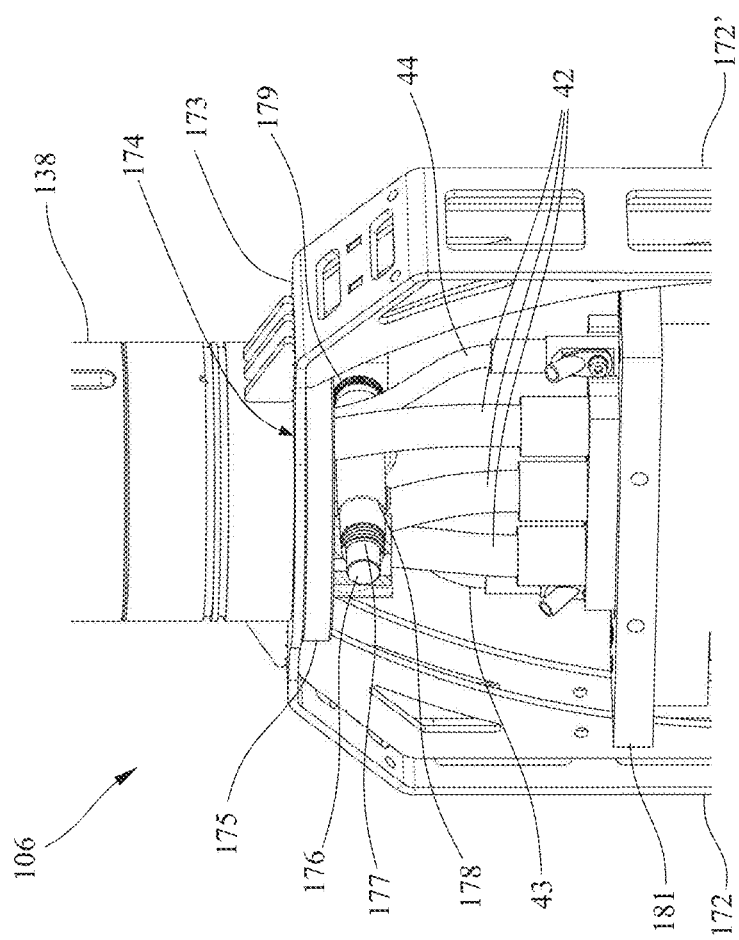
FIG. 22 shows an enlarged schematic three-dimensional detail view of an opened connection plug from a first obliquely lateral perspective.
Figure 23:
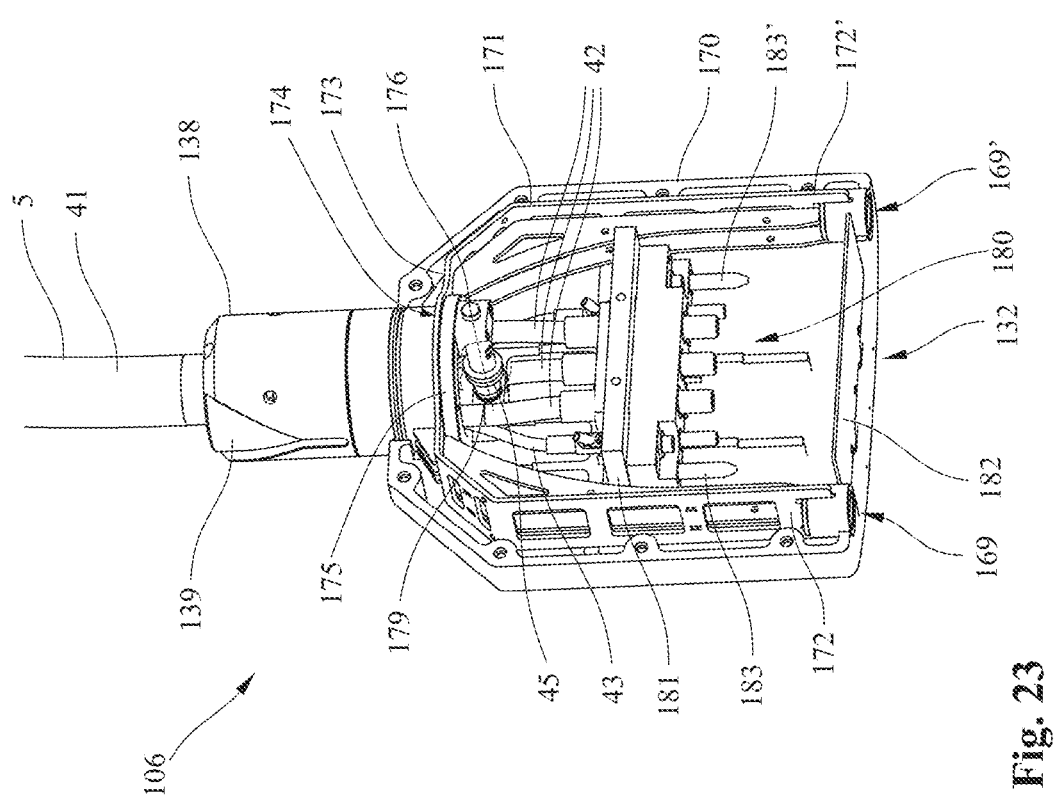
FIG. 23 shows a schematic three-dimensional view of the connection plug from FIG. 22 from a second obliquely lateral perspective.
Figure 26:
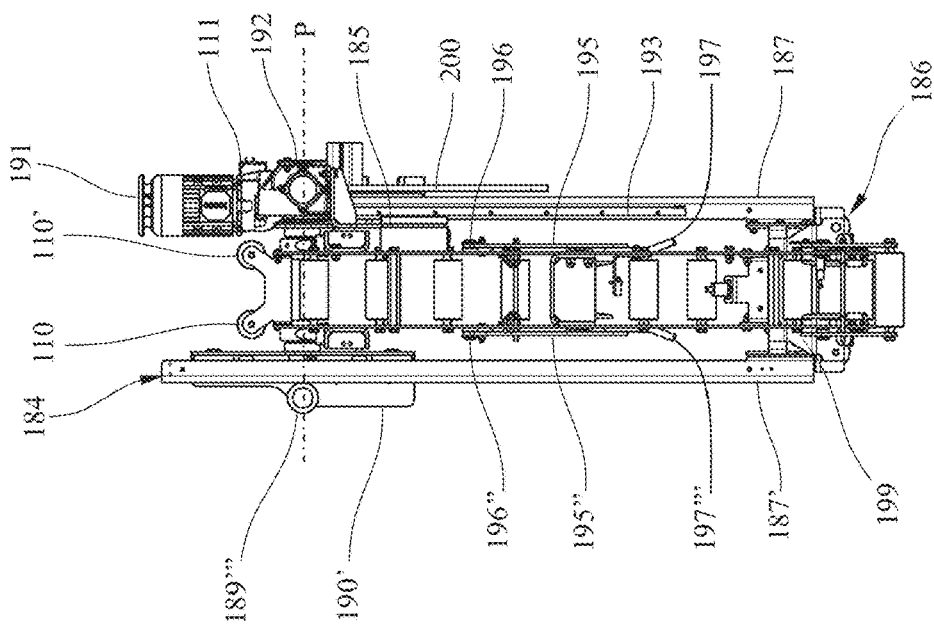
FIG. 26 shows a side view of the cable guide device from FIG. 25 from the left of FIG. 25.

The connection plug 106 has two plug cladding halves, only one plug cladding half 170 of which is shown in FIGS. 22 and 23, whereas the other is removed in order to be able to show the interior of the connection plug 106.

An essentially U-shaped support frame 171 made from a robust material, especially a steel sheet, is also provided, which has the already mentioned locking openings 169, 169' designed as an elongated hole on its free arm ends 172, 172'. The middle part 173 of the support frame 171 connecting the free arm ends 172, 172' then has a circular opening 174, through which the essentially hollow cylindrical gripping part 138 of the connection plug 106 is passed through from below in FIGS. 22 and 23. The gripping part 138 abuts an outer flange 175 in the shape of a circular ring on the support arm 171 and is fastened there, for example, screwed or riveted.

In order to be able to take up loads in the longitudinal direction of the line cable 5, tension unloading 47 of the outer sheath 41 can be clamped (not visible) in the gripping part 138 and/or on the support frame 171, on the one hand. On the other hand, a clamping pin 176 running across the longitudinal direction of line cable 5 is provided on the outer flange 175 in the shape of a circular ring of the gripping part 138. The clamping pin 176 has a fastening (not shown) for the support device 45, especially a passage opening through which the support device 45 can be pushed. A spring element, especially a coil spring 177 is arranged on the clamping pin 176, which is connected to an enclosing clamping pin sleeve 178, on which one end of the support device 45 is fastened. For tightening of the support device 45, the clamping pin 176 is initially forced out in its axial direction against the pressure of a coil spring 177 sitting on a beveled end 178 of the clamping end 176 from an anti-slip safety 179 depicted in FIG. 22. The clamping pin 176 is then repeatedly rotated in the winding direction so that the support device 45 is wound onto the clamping pin 176 with several windings. In order to prevent the support device 45 from unwinding again under load, the coil spring 177 then forces the clamping pin 176 back into the anti-slip safety 179 as is readily apparent in FIG. 22. Instead of the coil spring 177, other spring elements can also be used, for example, disk springs that force the clamping pins reliably back into the anti-slip safety 179 after the tightening of the support device 45. The anti-slip safety 179 can then advantageously have a knurled inner hole with which an also knurled end of the clamping pin 176 cooperates.

The different conductors 42 to 44, on the other hand, are guided unloaded through the circular opening 174 in the support frame 171 in the area between the free arm ends 172, 172' of the support frame 171 and connected there electrically and mechanically to the male electrical connection elements 180 in the connection plug 106. The individual male connection elements 180 are arranged on a connection support 181, which is held fixed in the longitudinal direction running from the connection plug opening 132 to the gripping part 138, i.e., also in the longitudinal direction of the line cable 5 and mounted free-floating across this longitudinal direction.

In order to protect the male connection elements 180 against unpermitted contact and other external influences, the connection plug opening 132 is closed by a protective flap 182. The protective flap 182 is then held by spring action in the closed position depicted in FIGS. 23 and 24 but can be tilted back by the force of a manipulator 118 in the area between the free arm ends 172, 172' during positioning of the connection plug 106 on the plug connection 114.

In order to be able to introduce the male connection elements 180 of the connection plug 106 into the corresponding female connection elements (not shown) on the plug connection 114, elongated centering pins 183 having a conical end are provided on the connection support 181, which engage in the corresponding centering openings of the plug connection 114 (not shown).

The centering funnel 139 on the gripping part 138 is readily apparent in FIG. 23, which in addition to the embodiment depicted in FIGS. 2 to 7, is lengthened slit-like into a centering slit on its lower end. The connection plug 106 can be gently aligned as perfectly as possible on the plug connection 114 during gripping with the gripping device 127 via the centering mandrel 140 provided in the insertion opening 128 of the gripping device 127 indicated in its position in the drawing.

An alternative cable guide device 107 depicted in detail in FIGS. 25 to 28 also has as an additional function to the embodiment depicted in FIG. 2, a swing arm 184 for better guiding of the line cable 5 (not shown in the drawing) in FIGS. 8 to 20 and 25 to 28. In principle, such swing arms are already known, but in the present case the possibility of linear mobility, especially linear height adjustment of the swing arm 184 is new relative to them. This serves to move out the swing arm 184 situated fully in the lower position during travel of crane 1 entirely upward and from the gripping area of manipulator 118 for automatic gripping of the connection plug 106 by means of manipulator 118 and for the proper positioning of the connection plug 106.

Figure 27:
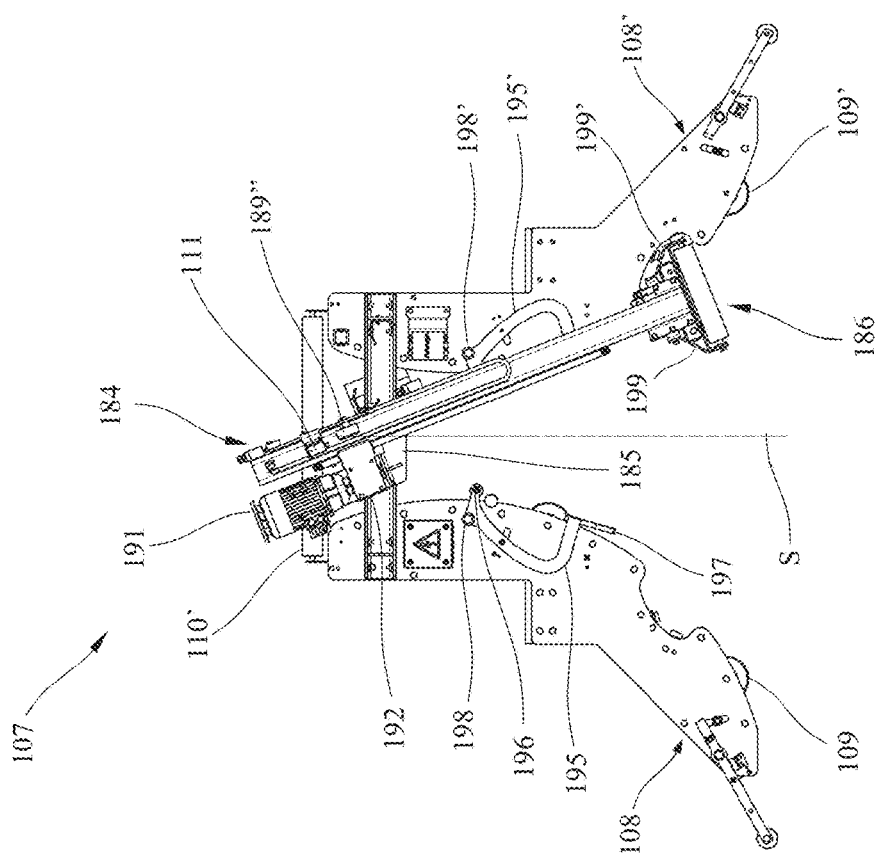
FIG. 27 shows a front view of the cable guide device from FIG. 25 showing a height-adjustable swivel in a first lower position.

A swivel mount 185 rotatable around an essentially horizontal pivot axis P aligned across the travel direction F of crane 1 is then provided on the cable guide device 107 so that the swing arm 184 can swing back and forth around pivot axis P, as is apparent in FIG. 27.

Deflection of the swing arm 184 from the vertical S is produced in known fashion by the line cable 5 wound or unwound during travel of crane 1, which runs through a cable guide 186 arranged on the lower end of the swing arm 184 with longitudinally and transversally aligned cable guide rollers. It can then be detected via known, not further shown, taut and slack sensors whether the line cable 5 is guided taut or slack and the line cable 5 can then optionally be pulled in or paid out. The line cable 5 is preferably guided through an additional cable guide arranged in front of the cable guide 186 of the swing arm 184 in the pay-out direction of the line cable 5, which is advantageously arranged between and/or on the upper end of the two roller bends 108, 108'. The cable guide can advantageously be formed by the side guide rollers 110, 110', but other possibilities for guiding a line cable 5 could also be provided.

Figure 25:
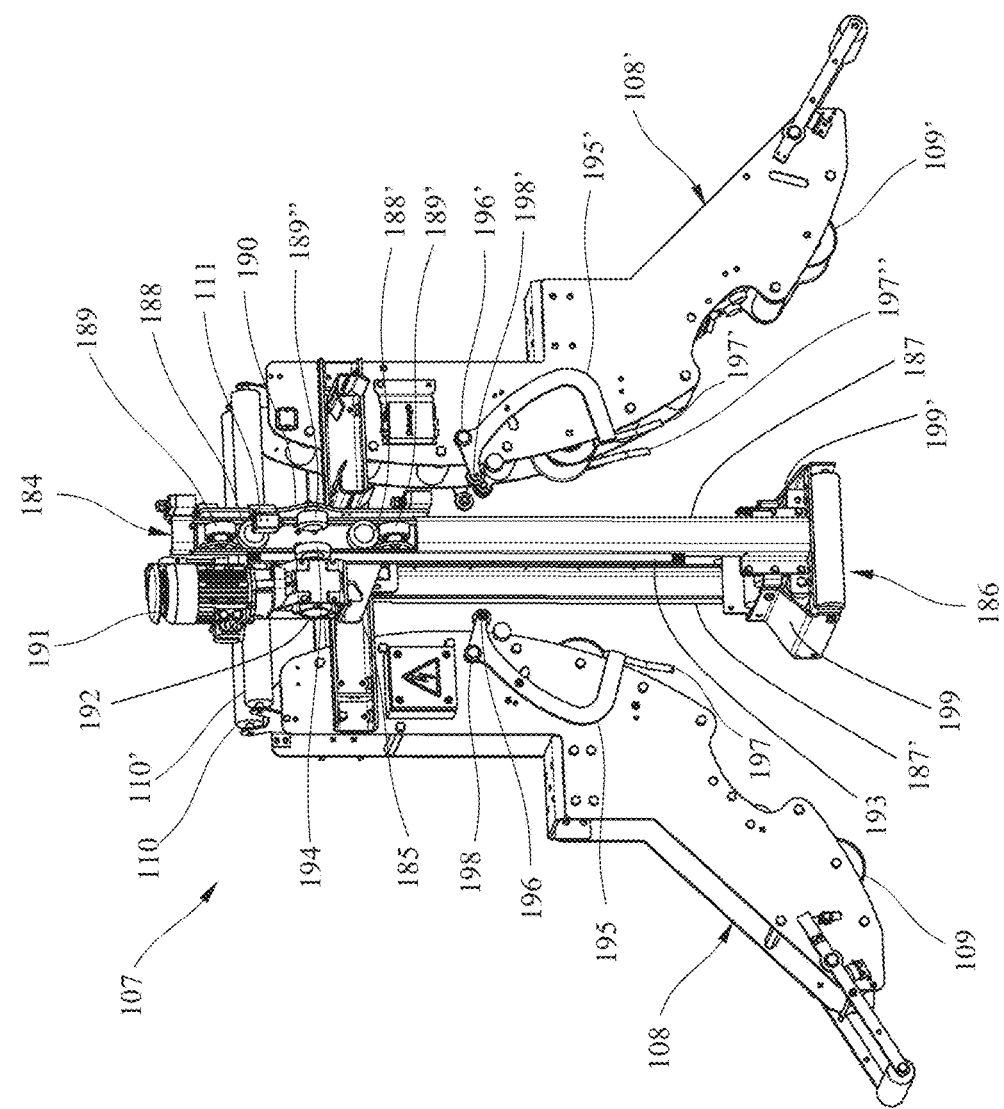
FIG. 25 shows a schematic three-dimensional view of a cable guide device from FIGS. 9 to 12.
Figure 28:
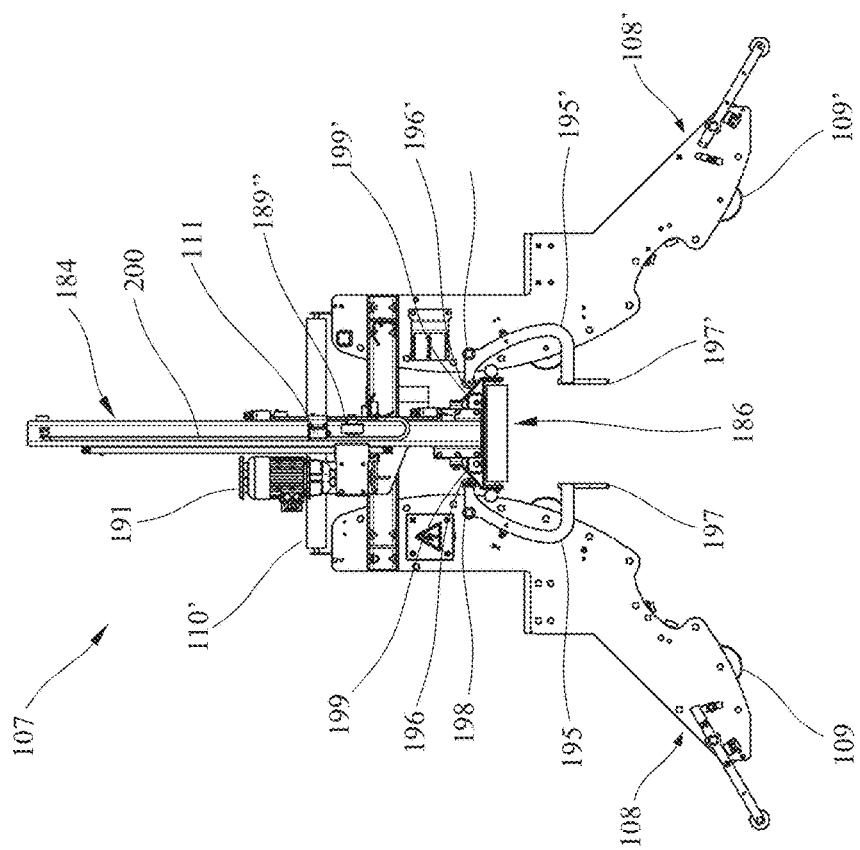
FIG. 28 shows a front view of the cable guide device from FIG. 25 showing the height-adjustable swivel in a second upper position.

In order to be able to move the swing arm 184 back and forth between the upper and lower extreme positions depicted in FIGS. 25 and 28, the swing arm 184 has two guide rails 187, 187' facing each other with their open sides and are U-shaped in cross section, depicted partially broken down in FIG. 25. The guide rail 187 is guided by means of the lateral guide rollers 188, 188', the inner front guide rollers 189, 189' and an outer front guide roller 189" running on the outside of the center arm of the guide rail 187 positioned on the swivel mount 185. The guide rail 187 is then guided laterally by an angled guide sheet 190, on which the outer front guide roller 189" is arranged. Guiding of the guide rail 187' is designed accordingly, in which case the guide sheet 190' of the other guide rail 187' with the external front guide roller 189" arranged on the side of the cable guide device 107 opposite the swivel mount 185 is readily visible.

A swivel drive movable with the swing arm 184 is also provided on the swivel mount 185 with an electric motor 191, a 90° gear mechanism 192, as well as a drive pinion 194 meshing on a rack 193 mounted on the swing arm 184. The swing arm 184 can be moved by the motor back and forth in its longitudinal direction relative to the swivel mount 185. As an alternative, a direct linear drive or toothed belt drive can also be used for retraction and extension of the swing arm 184.

In order to be able to properly position the connection plug 106 for the gripping device 127 in the cable guide device 107, the swing arm 184 travels fully upward, as shown in FIGS. 8 to 11 and 28. At the same time or afterward the connection plug 106 is pulled fully upward via the line cable 5 to the cable guide 186 of the swing arm 184.

In order to be able to position the connection plug 106 even better for gripping by manipulator 118 in the cable guide device 107, the retaining clamps 195, 195' opposite each other are arranged on the roller bends 108, 108'. The retaining clamps 195, 195' are then rotatable around essentially horizontal axes of rotation 196, 196' running across travel direction F and have downward running rod-like holding extensions 197, 197', 197", 197"', which lie against the connection plug 106 in the upper position depicted in FIGS. 8 and 28 and thus prevent twisting or escape of the connection plug 106 during gripping by the gripping device 127.

The retaining clamps 195, 195' are held in a standard fashion by springs in the open retracted position against the roller bends 108, 108' shown in FIGS. 12, 25 and 27.

Only when the swing arm 184 is moved into the upper retaining position depicted in FIGS. 8 to 11 and 28, do the stop rollers 198, 198' abut against the upper shorter lever arms of the retaining clamps 195, 195' on the corresponding stops 199, 199' of the cable guide 186 so that the lower, longer, roughly L-shaped inward bent lever arms of the retaining clamps 195, 195' are moved toward each other and toward the connection plug 106. The retaining clamps 195, 195' can also be configured differently, it only being essential that during raising of the swing arm 184 or optionally also the connection plug 106 the retaining clamps 195, 195' are moved against the connection plug 106.

As is apparent in FIG. 27, the cable guide stops 199, 199' then additionally serve as activation elements for the not further shown taut sensors, when the swing arm 184 is pulled into its laterally fully deflected position.

The sensor 111 described above is arranged on the swing arm 184, in which it is supplied power via an energy chain 200 and is connected in terms of data to the crane control. The sensor 111, however, could also be arranged at a location of the cable guide device 107 or also on crane 1 and could also be connected wirelessly to the control.

Figure 30:
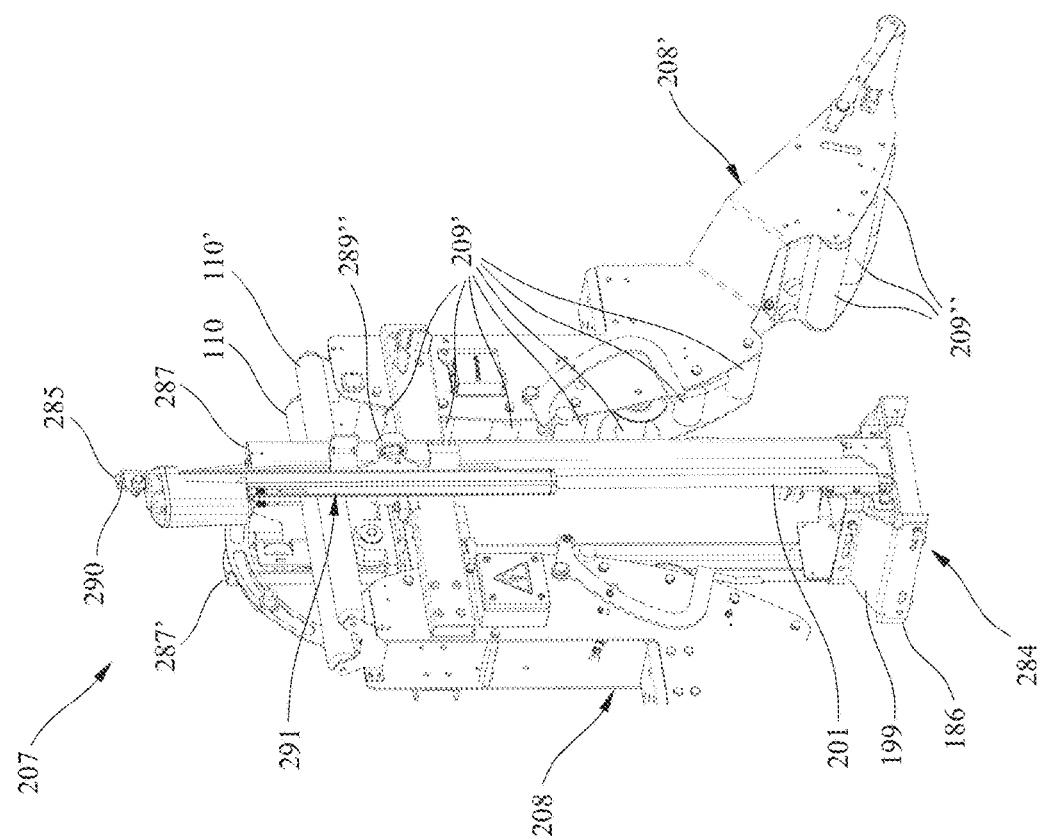
FIG. 30 shows part of a schematic three-dimensional view from FIG. 29 from another perspective.
Figure 29:
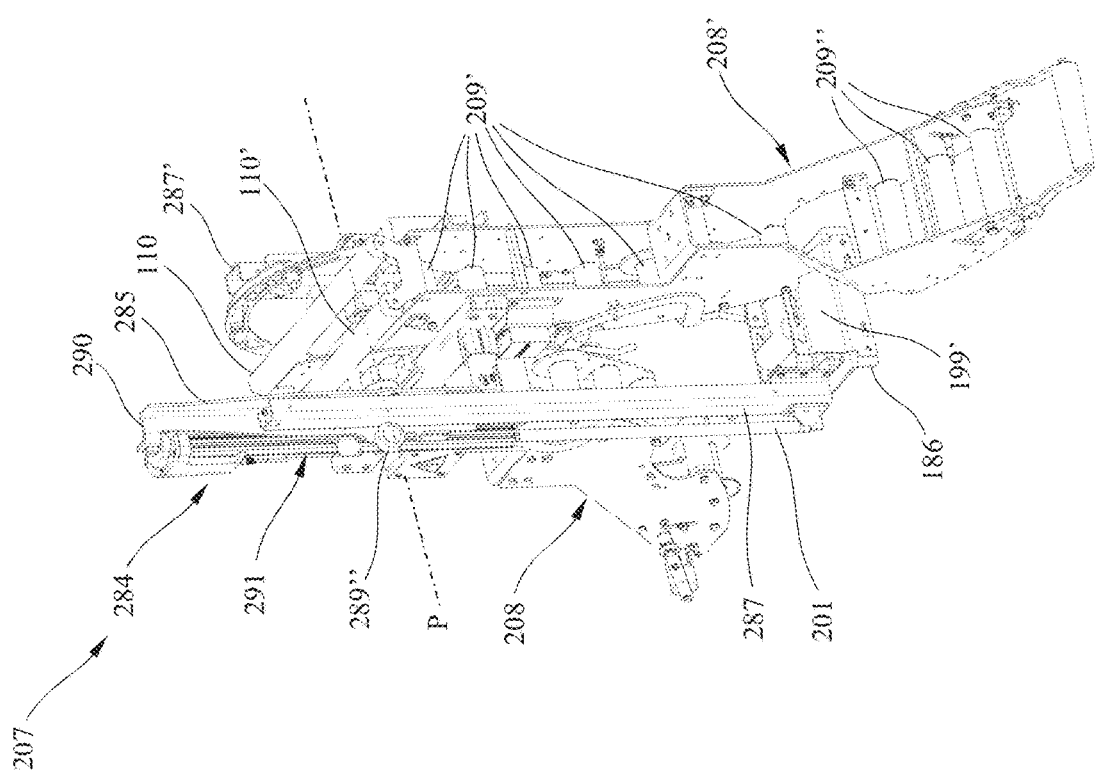
FIG. 29 shows a schematic three-dimensional view of an alternative cable guide device.

FIGS. 29 to 30 show an alternative embodiment of the cable guide device 207, which differs essentially by two things from the embodiment shown in FIGS. 25 to 28, namely, on the one hand, the configuration of roller bends 208, 208' and longitudinal guide rollers 209, 209' and 209", as well as, on the other hand, an alternative drive 291 of a swing arm 284. Corresponding reference numbers, each supplemented by the number "200", are therefore used in the cable guide device 207. In addition, mostly the differences are taken up here so that comments concerning corresponding parts in the first variant according to FIGS. 2 and 7 and the second variant according to FIGS. 8 to 28 also apply accordingly in the variant depicted in FIGS. 29 and 30, unless otherwise stated.

Outer longitudinal guide rollers 209''' in the outer lower area of the roller bend 208' are then wider than the inner longitudinal guide rollers 209' of the roller bend 208' arranged in the interior, upper area of the roller bend 108'. This has the advantage that during payout of the line cable 5 not fully parallel to travel direction F of crane 1, the line cable 5 in the outer area of the roller bend 208 can have a somewhat more lateral offset, i.e., a slightly oblique alignment of the line cable 5 relative to the longitudinal extent of the roller bend 208 when viewed from above on the cable guide device 207. For this purpose, the frame of the roller bend 208' on its outer, lower, outward facing end preferably has a larger spacing of two opposite walls, between which the longitudinal guide rollers 209''' are fastened, than in the area of the inner, narrower longitudinal guide rollers 209'. The second, other roller bend 208 is designed correspondingly shifted to the side, otherwise the comments concerning roller bend 208' apply accordingly.

In addition, instead of the rotational electric motor 191 depicted in FIGS. 25 to 28, a direct linear drive 291 is used for longitudinal movement of the swing arm 284. The swivel mount 285 is then lengthened somewhat upward, as is the angled guide sheet 290. The drive part of the linear drive 291 can preferably be supported on the angled guide sheet 290 or the swivel mount 285, whereas a movable piston rod 201 of the linear drive 291 is fastened to the movable part of the swing arm 284. The end of the piston rod 201 on the takeoff side can preferably be mounted on the lower end of the movable part of the swing arm 284 in FIGS. 29 and 30, especially a U-shaped guide rail 287. For raising of the swing arm 284, the piston rod 201 is then moved upward.

As described in detail above, a simple automatic connection of the connection plug 6, 106 of the line cable 5 with the feed device 12, 112 can be made possible by means of the connection device 13, 113 according to the invention without the need to insert or unplug the connection plug 6, 106 by hand. For this purpose, according to a further aspect of the invention the line cable 5 can have a special structure for a better automatic connection. The connection plug 6, 106 can also be advantageously designed in order to improve gripping with the manipulator 18, 118 and especially the gripping device 27, 127. For simplified automatic gripping of the line cable 5 and the connection plug 106 a height-adjustable swing arm 284 can also be provided. A further aspect of the invention permits cable-sparing guiding of the line cable 5.

The feed direction H preferably runs to the cable guide device 7, 107 or 207 and crane 1 and from it and preferably across travel direction F. In an embodiment not shown the manipulator 18 or 118 and/or the gripping device 27 or 127, however, can also be movable in travel direction F in order to be able to compensate for any offset in travel direction F. The manipulator 18 or 118 and/or the gripping device 27 or 127 can also be rotatable around a vertical axis in order to be able to better compensate for angular offset, for example, with an obliquely positioned cable guide device 7, 107 or 207.

LIST OF REFERENCE NUMBERS

1 Container crane (E-RTG)
2 Container
3, 3' Wheels
4 Cable drum
5 Line cable
6; 106 Connection plug
7; 107; 207 Cable guide device
8, 8'; 108, 108'; 208, 208' Roller bend
9, 9'; 109, 109'; 209, 209', 209'' Longitudinal guide rollers
10, 10', 110, 110' Lateral guide rollers
11; 111 Sensor unit
12; 112 Feed device
13; 113 Connection device
14, 14', 14''; 114, 114', 114'' Plug connections
15, 15'; 115, 115', 115'' Connection part (pivot plate)
16, 16'; 116 Bearing for connection part
17; 117 Fastening plate
18; 118 Manipulator
19 Manipulator base
20 Lower manipulator arm
21, 21', 21'' Lower partial arms
22 Lower manipulator drive
23 Cross-shaped connection piece
24 Upper manipulator arm
25, 25' Upper partial arms
26 Upper manipulator drive
27; 127 Gripping device
28; 128 Funnel-like introduction opening
29; 129 Signal mast
30; 130 Identifying plate
31 Signal light
32; 132 Connection plug opening
33, 33' Connection housing
34, 34' Cover
35, 35' Hinges for cover
36, 36' Activation tabs for cover
37, 37' Stop for pivot plate
38, 138 Gripping part connection plug
39, 139 Centering funnel
40, 140 Centering mandrels
41 Outer sheath
42 Phase conductor
43 Protective conductor
44 Data transmission conductor
45 Support device
46 Filler, molded article
47 Tension relief
148 Switchbox
149 Power supply and data cable
150, 150', 150'' Cable lead-throughs
151 Support feet
152 Boom
153 Central area identifying plate
154, 154' Edge areas identifying plate
155 Foundation
156 Depression
157, 157', 157'' First movable protective enclosures
158, 158', 158'', 158''' Side walls, front wall, opening first protective enclosure
159, 159', 159'' Second, fixed protective enclosures
160, 160', 160'', 160''' Side walls, front wall, opening second protective enclosure
161, 161' Centering clamp
162, 162' Vertical guide area centering clamp
163, 163' Oblique insertion area centering clamp
164, 164', 164'' Plug lock
165, 165', 165'' Locking pin
165a, 165a', 165a'' Locking pin
166, 166', 166'' Elongated locking head 167, 167', 167" Locking drive
168, 168', 168" Lever arrangement
169, 169' Elongated locking opening
170 Plug cladding halves
171 U-shaped support frame
172, 172' Arm ends
173 Support frame—middle part
174 Circular opening support frame
175 Outer flange gripping part
176 Tightening pin
177 Coil spring
178 Beveled end of tightening pin
179 Anti-slip safety
180 Manual connection elements connection plug
181 Connection support
182 Protective flap
183 Elongated centering pin
184; 284 Swing arm
185; 285 Swivel mount
186 Cable guide
187, 187'; 287, 287' U-shaped guide rails
188, 188' Lateral guide rollers
189, 189', 189", 189"'; 289" Frontal inside and outside guide rollers
190, 190'; 290 Angled guide sheet
191; 291 Electric motor (rotational), linear drive
192 90° gear mechanism
193 Rack
194 Drive pinion
195, 195' Retaining clamp
196, 196' Retaining clamp—axes of rotation
197, 197' Retention extensions
198, 198' Stop rollers
199, 199' Cable guide stops
200 Energy chain
201 Piston rod linear drive
D Horizontal axis of rotation connection part
F Travel direction crane
H Horizontal feed direction manipulator
P Pivot axis swing arm
S Vertical of swing arm
V Vertical feed direction manipulator

The invention claimed is:

1. A feed device for a wired supply of electrical power and/or data to an electrical load movable in at least one travel direction relative to the feed device, in which an electrical line cable carried by the electrical load can be connected or is connected to the feed device, wherein the feed device includes at least one connection part for the line cable rotatable around at least one pivot axis, the connection part includes a plug connection for a corresponding connector of the line cable, the feed device further includes a retaining device to keep the connection part in a rest position, and the line cable protrudes upward and the plug connection faces upward in the rest position of the connection part.

2. The feed device of claim 1, wherein the connection part is connected to a bearing, the connection part being rotatable around the at least one pivot axis around the bearing.

3. The feed device of claim 1, wherein the pivot axis runs across the travel direction or a laying direction of the line cable running from the feed device to the movable electrical load.

4. The feed device of claim 1, wherein the pivot axis runs substantially parallel to a base provided for laying of the line cable.

5. The feed device of claim 1, wherein the connection part can be deflected from the rest position in both directions of rotation of the pivot axis.

6. The feed device of claim 1, wherein a return device is provided in order to move the connection part from the position deflected from the rest position back to the rest position.

7. The feed device of claim 1, wherein a pivot angle around the at least one pivot axis amounts to at most 225°.

8. The feed device of claim 1, wherein a depression is provided beneath the connection part for power and/or data cables arranged in the depression and connected to the connection part.

9. The feed device of claim 8, wherein the depression has a cover with at least one connection opening for the power and/or data cables.

10. The feed device of claim 1, wherein the plug connection is pivotable around the at least one pivot axis with the connection part.

11. The feed device of claim 10, wherein the plug connection includes electrical connection parts with an enclosing housing, and the housing can be closed with an automatically closing cover.

12. The feed device of claim 10, wherein the feed device further includes a plug lock for releasable fastening of the connector to the connection part.

13. The feed device of claim 10, wherein the connection part has at least one positioning aid for the connector of the line cable.

14. A power supply system for a wired supply of a movable electrical load, the power supply system comprising the feed device of claim 1 and a line cable connectable and/or connected to the feed device, wherein the line cable can be paid out or retrieved from a reservoir carried by the load according to a distance between the reservoir and the feed device.

15. The power supply system of claim 14, wherein the line cable is connected to the connection part of the feed device.

16. The power supply system of claim 15, wherein one connection end of the line cable has a connector and is connectable to the plug connection of the feed device.

17. The power supply system of claim 14, wherein the reservoir is a motor-driven cable drum.

18. The power supply system of claim 14, wherein a laying direction of the line cable runs from the feed device to an outlet of the line cable from a guide device arranged on the load.

19. The feed device of claim 1, wherein when the plug connection is unconnected, the retaining device keeps the plug connection facing upward in the vertical direction.

20. The feed device of claim 1, wherein when the plug connection is connected, the connector of the line cable faces downward in the vertical direction in the rest position of the connection part.

21. A feed device for a wired supply of electrical power and/or data to an electrical load movable in at least one travel direction relative to the feed device, in which an electrical line cable carried by the electrical load can be connected or is connected to the feed device, wherein the feed device includes at least one connection part for the line cable rotatable around at least one pivot axis, and the connection part can be pivoted around an additional pivot axis running essentially perpendicular to a base provided for laying of the line cable.

22. A feed device for a wired supply of electrical power and/or data to an electrical load movable in at least one travel direction relative to the feed device, in which an electrical line cable carried by the electrical load can be connected or is connected to the feed device, wherein the feed device includes at least one connection part for the line cable rotatable around at least one pivot axis, a depression is provided beneath the connection part for power and/or data cables arranged in the depression and connected to the connection part, and the connection part includes a first protective enclosure movable with the connection part on a side facing the depression.

23. The feed device of claim 22, wherein the first protective enclosure is movable in a second protective enclosure arranged fixed in the depression.

24. The feed device of claim 22, wherein the depression has a cover with a connection opening through which the first protective enclosure is moved.

25. A feed device for a wired supply of electrical power and/or data to an electrical load movable in at least one travel direction relative to the feed device, in which an electrical line cable carried by the electrical load can be connected or is connected to the feed device, wherein the feed device includes at least one connection part for the line cable rotatable around at least one pivot axis, the connection part includes a plug connection for a corresponding connector of the line cable, the plug connection is pivotable around the at least one pivot axis with the connection part, the connection part further includes at least one positioning aid for the connector of the line cable, and the positioning aid includes two centering clamps to accommodate the connector running laterally next to the plug connection.

26. The feed device of claim 25, wherein the centering clamps have a vertical guide area substantially adapted to an outside contour of the connector and/or an introduction area that widens upward.

* * * * *